(12) United States Patent  
Nagao

(10) Patent No.: US 7,242,851 B2  
(45) Date of Patent: Jul. 10, 2007

(54) PLAYBACK APPARATUS, PLAYBACK METHOD, AND PROGRAM PRODUCT WITH PLAYBACK PROCESSING PROGRAM

(75) Inventor: Takeshi Nagao, Nagoya (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 174 days.

(21) Appl. No.: 11/092,759

(22) Filed: Mar. 30, 2005

(65) Prior Publication Data

US 2005/0232594 A1 Oct. 20, 2005

(30) Foreign Application Priority Data

Apr. 1, 2004 (JP) ............... 2004-108847

(51) Int. Cl.
G09C 5/00 (2006.01)
H04N 5/91 (2006.01)
H04N 5/913 (2006.01)

(52) U.S. Cl. .............................. 386/94; 386/95

(58) Field of Classification Search .............. 386/94, 386/95, 68

See application file for complete search history.

(56) References Cited

U.S. PATENT DOCUMENTS 5,963,909 A * 10/1999 Warren et al. ............ 386/94
5,973,625 A * 10/1999 Nam .......................... 341/50
6,584,275 B1 * 6/2003 Blatter ....................... 386/94
6,865,747 B1 * 3/2005 Mercier ..................... 725/94
2001/0041050 A1 * 11/2001 Iwata et al. ................ 386/52
2003/0175013 A1 * 9/2003 Kato et al. ................. 386/94

FOREIGN PATENT DOCUMENTS

EP 786909 A2 * 7/1997
JP 2002-112210 4/2002

* cited by examiner

Primary Examiner—Jeffrey Stucker
Assistant Examiner—David N. Werner
(74) Attorney, Agent, or Firm—Wenderoth, Lind & Ponack, L.L.P.

(57) ABSTRACT

A playback apparatus for precisely reflecting attribute information such as copyright information even in a special playback mode, such as reverse slow playback, fast playback and reverse playback. Encoded presentation data such as a video and audio is separated by a stream analysis section, is decoded by a decoder and is outputted by an output control section. Attribute information such as copyright information and a presentation time which corresponds to this attribute information are extracted by a copyright-information acquisition section, and a table in which these are recorded is created by a copyright-information management section. Then, at a specific time which is indicated by the presentation time that is recorded in the table, the attribute information which corresponds to the presentation time is reflected in an output of the presentation data by a playback-mode control section and the output control section.

19 Claims, 15 Drawing Sheets

FIG.6

THE CONFIGURATION
OF A PMT INCLUDED
IN A TS PACKET

```
program_map_section( ){
    table_id
    section_syntax_indicator
    0
    reserved
    section_length
    program_number
    reserved
    version_number
    current_next_indicator
    section_number
    last_section_number
    reserved
    PCR_PID
    reserved
    program_info_length
    for(i=0; i<N; i++){          //THE FIRST LOOP
        descriptor( )             //A DTCP DESCRIPTOR INCLUDED
    }
    for(i=0; i<N; i++){
        stream_type
        reserved
        elementary_PID
        reserved
        ES_info_length
        for(j=0; j<M; j++){       //THE SECOND LOOP
            descriptor( )          // A DTCP DESCRIPTOR
        }                          // AND A DIGITAL-COPY
    }                              // CONTROL DESCRIPTOR
    CRC_32                         //    INCLUDED
}
```

FIG.8

| j = 0 | j = 1 |
|---|---|
| V1 (k=0, l=0) | V1 (k=0, l=3) |
| V2 (k=1, l=1) | V2 (k=1, l=4) |
| V3 (k=2, l=2) | |
| CCI=FREE | CCI=NEVER |

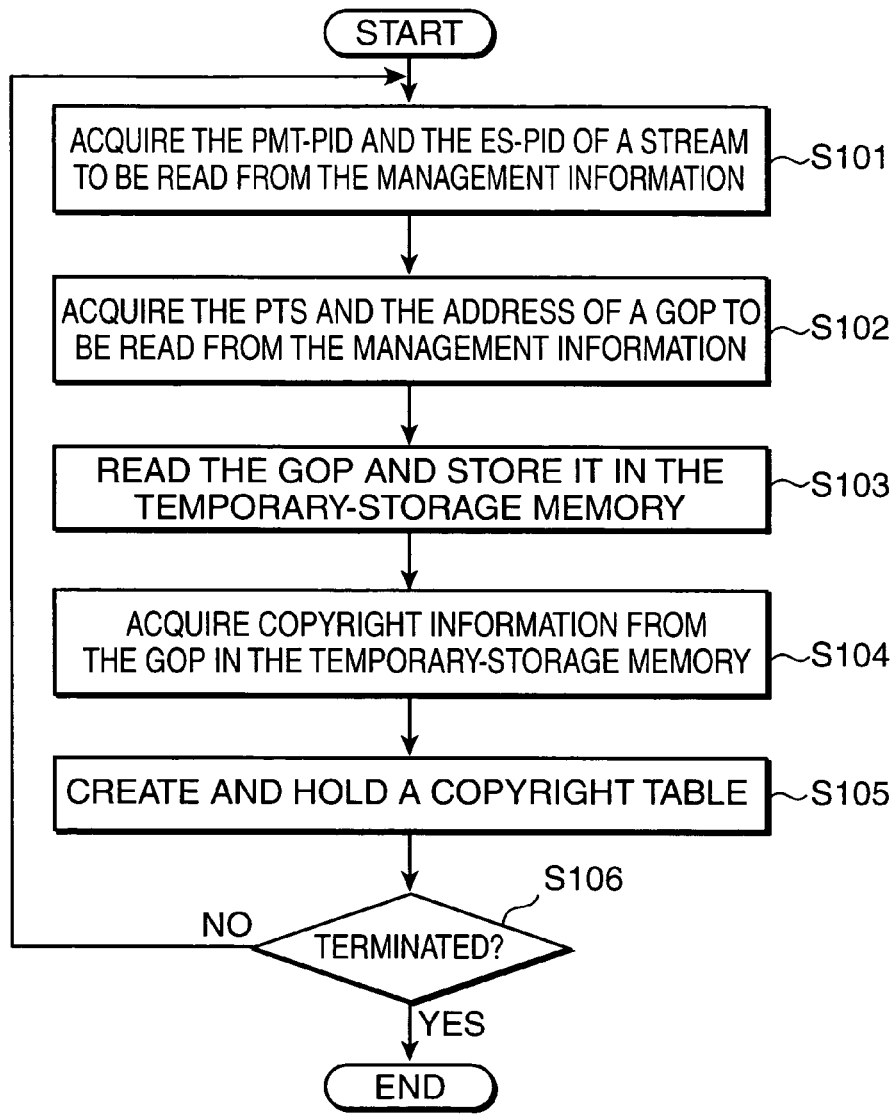

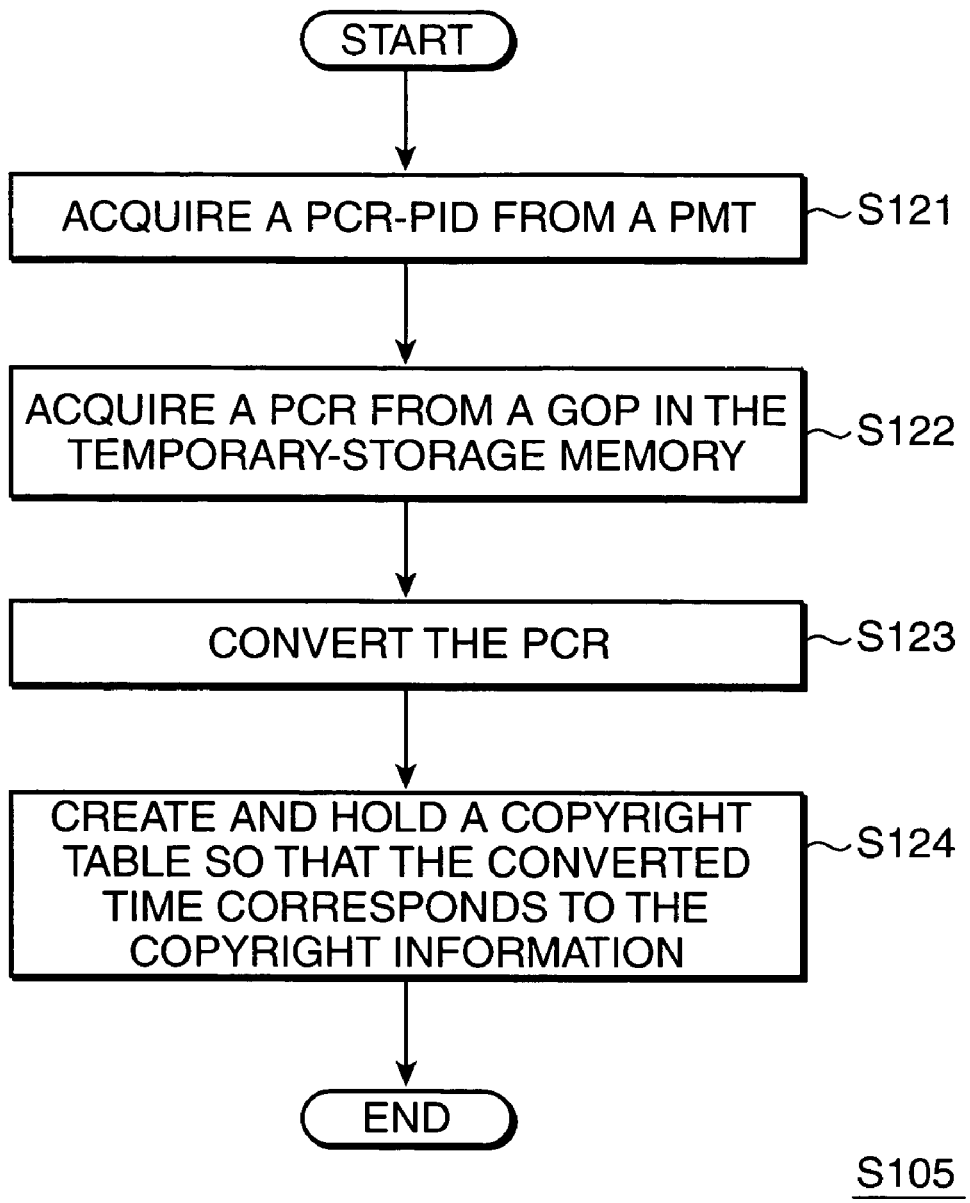

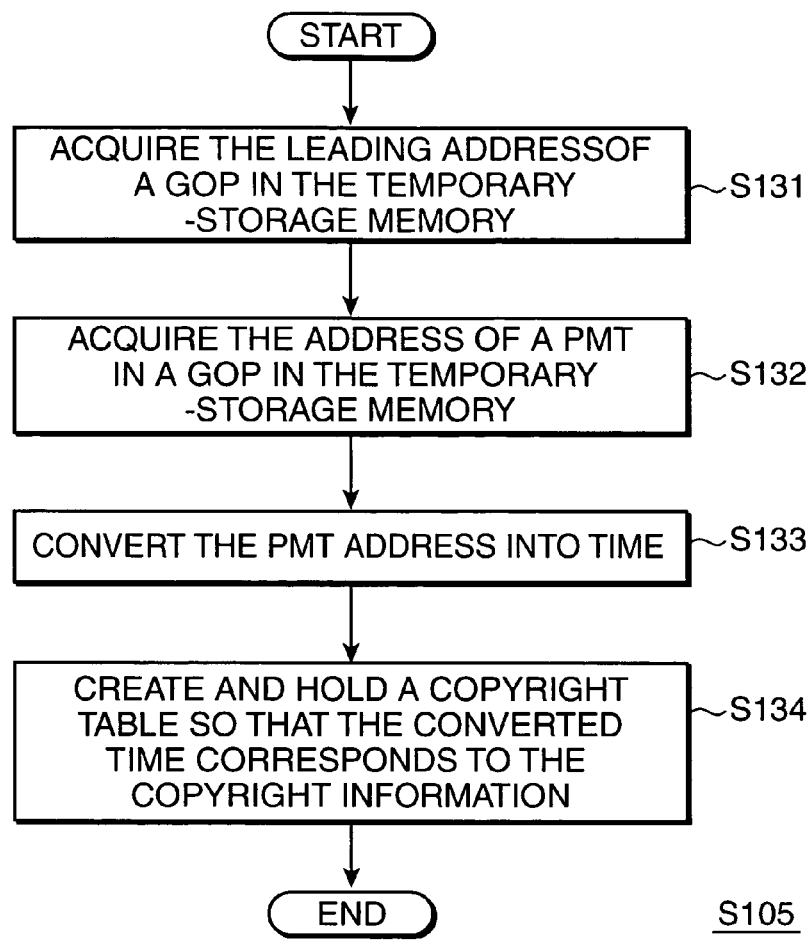

PLAYBACK APPARATUS, PLAYBACK METHOD, AND PROGRAM PRODUCT WITH PLAYBACK PROCESSING PROGRAM

BACKGROUND OF THE INVENTION

1. Field of the Invention

The present invention relates to a playback apparatus which is suitably used for a usage form in which contents, including video, audio or the like, are read from a record medium where those contents are recorded, and then, the original video, audio (such as music) or data is restored or transmitted to another piece of equipment or a network. It also relates to a playback method and a program product wherein a playback processing program is held by a signal holding medium, which are suitably used for the same usage form.

2. Description of the Related Art

Conventionally, a playback art has been known which has the function of regenerating contents as well as copyright information and restricting the use of the contents. As such a playback art, for example, Japanese Patent Laid-Open No. 2002-112210 specification describes an additional-information embedding apparatus. In that conventional apparatus, additional information is embedded in a video signal. As a more general art, an apparatus or a method has been known in which additional information is embedded in a data part except a video signal. As an example of such an art, there is a hard-disk drive playback apparatus (hereinafter, referred to as the "HDD playback apparatus") whose main configuration is shown in FIG. 16.

An HDD playback apparatus 900 plays contents which includes a stream and management information. The stream includes a packet group which is obtained by multiplexing a video, audio, or attribute information. The management information is copyright information on the entire stream or information on its configuration. The packet includes a packet header, and a payload which carries a video, audio, data, a caption, or attribute information. The packet header includes information on multiplexing, or the like. It often includes copyright information. In the video, there is included, for example, MPEG2-video, MPEG4-video, or the like. MPEG2-AAC or the like is included in the audio. In the attribute information, there is included, for example, information such as copyright information which is included in a PMT (or program map table) that is defined in a MPEG2-TS, a PAT (or program association table), a SIT (or selection information table), or the like.

The copyright information is information which decides whether or not a permission to make a copy, such as stream recording, should be given. In short, it is information which defines restrictions on copying. For example, there are CopyFree, CopyOnce, and the like. The CopyFree indicates that stream recording can be freely made, and the CopyOnce indicates that stream recording can be made only once. Except for such information, there are also known CopyNoMore which indicates that no more stream recording can be made, CopyNever which indicates that stream recording can never be made, or the like.

The HDD playback apparatus 900 shown in FIG. 16 includes: a playback-mode control section 912; a reading control section 914; a management-information control section 916; a transfer control section 918; a decoder control section 920; a record medium 922; a temporary-storage memory 924; a stream analysis section 926; a decoder 928; and an output control section 930. The record medium 922 is used to record contents. When contents are recorded in the record medium 922, or when they are read from the record medium 922 and played, both a stream and management information are recorded and played. In further detail, when contents are recorded in the record medium 922, the management-information control section 916 generates management information, based on various kinds of information which are included in a stream. Then, it records the management information in the record medium 922. On the other hand, when contents are read from the record medium 922, a stream is read out to the temporary-storage memory 924 by the reading control section 914, and management information is read out to the management-information control section 916 by the reading control section 914.

The HDD playback apparatus 900 plays, in various modes, contents which are recorded in the record medium 922. The playback mode is controlled by the playback-mode control section 912. As the playback mode, there is, for example, a normal playback, a double-speed playback, a quadruple-speed playback, a half-speed playback, a reverse playback, a double-speed reverse playback, a quadruple-speed reverse playback, a half-speed reverse playback, a normal playback or a reverse playback at another speed, or the like.

According to the control by the playback-mode control section 912, the reading control section 914 reads the stream which is recorded in the record medium 922. Then, it stores the stream in the temporary-storage memory 924. For example, at the time of the quadruple-speed playback, the reading control section 914 needs to read the stream at quarter the cycle of the normal playback from the record medium 922 and store it in the reading control section 914. In contrast, for example, at the time of the half-speed playback, the reading control section 914 reads the stream at double the interval of the normal playback from the record medium 922 and stores it in the reading control section 914. According to the control by the playback-mode control section 912, the transfer control section 918 reads the stream which is stored in the temporary-storage memory 924. Then, it sends the stream to the stream analysis section 926.

According to the control by the transfer control section 918, the stream analysis section 926 analyzes the contents of the stream which has been sent from the temporary-storage memory 924. At the lower part of FIG. 16, an example is shown of a part of the stream which is analyzed by this stream analysis section 926. This example shows only a video stream which is included in the stream. Besides, it shows only the fourth and the fifth of a GOP (or group of picture) which is compressed and encoded in an MPEG2 format.

In order to make this description simpler, let's assume that an I-picture, a B-picture and a P-picture are included in each GOP, as shown in the figure. In the stream, copyright information is encoded, simultaneously with the video stream shown in the figure. In the figure, such information is shown under each GOP of the video stream. In the example of the figure, the copyright information from the I-picture of the fourth GOP up to the fifth picture (i.e., the third B-picture) is "A". On the other hand, the copyright information on the sixth picture and the following picture and all the pictures of the fifth GOP is "B". Herein, for example, the copyright information "A" represents the "CopyOnce", while the copyright information "B" represents the "CopyNoMore". According to the control by the transfer control section 918, the stream analysis section 926 reads, from the temporary-storage memory 924, such a stream which includes the video stream and the copyright information as shown in FIG. 16. Then, it analyzes its contents.

The copyright information which has been analyzed by the stream analysis section 926 is sent to the transfer control section 918. The transfer control section 918 refers to the copyright information which has been analyzed and extracted by the stream analysis section 926. It also refers to the management information which is stored in the management-information control section 916 or copyright information on all the contents which are recorded and managed separately from a video stream, another piece of control information, or the like. Thereby, it creates output control information on this stream.

For example, let's assume that the copyright information which has been encoded at the same time with the video stream is "A" and this "A" represents the "CopyOnce", and that the present playback mode which is controlled by the playback-mode control section 912 is a normal playback mode. In that case, this stream needs to be overlaid with the copyright information of "CopyNoMore" and outputted from the output control section 930. On the other hand, for example, let's assume that the copyright information which has been encoded at the same time with the video stream is "B" and this "B" represents the "CopyNoMore". Then, for example, if the present playback mode which is controlled by the playback-mode control section 912 is the normal playback mode, this stream needs to be overlaid with the copyright information of "CopyNever" and outputted from the output control section 930.

For example, let's assume that the copyright information which has been encoded at the same time with the video stream is "A" and this "A" represents the "CopyOnce", and that the present playback mode which is controlled by the playback-mode control section 912 is the normal playback mode. Even in such a case, if the copyright information on all the contents which are recorded and stored in the management-information control section 916 represents, for example, the "CopyNoMore", then this stream needs to be overlaid with the copyright information of "CopyNever" and outputted from the output control section 930.

Therefore, if there are both the copyright information which has been encoded at the same time with the video stream and the copyright information on all the contents which are recorded and stored in the management-information control section 916, the transfer control section 918 compares both. Then, it extracts stricter copyright information, and as information for output control (hereinafter, referred to as the "output-control information"), sends it to the playback-mode control section 912. On the other hand, if there is only either of the copyright information which is encoded in the video stream and the copyright information on all the contents which are recorded and stored in the management-information control section 916, there is no need to refer to both. Thus, the transfer control section 918 sends either of the two pieces of copyright information as the output-control information to the playback-mode control section 912. Furthermore, if there is neither of the copyright information which is encoded in the video stream and the copyright information on all the contents which are recorded and stored in the management-information control section 916, the transfer control section 918 makes an output free and sends information to that effect to the playback-mode control section 912.

In addition to the copyright information, if some attribute information which may restrict the use of the contents is encoded and included in the video stream, or recorded and stored in the management-information control section 916, the transfer control section 918 refers to all these pieces of information. Then, it compares and considers them, extracts the strictest condition as the output-control information, and sends it to the playback-mode control section 912. In contrast, depending upon the setting of the transfer control section 918, the transfer control section 918 can extract, for example, the most lenient condition as the output-control information and send it to the playback-mode control section 912. Besides, it is also possible to set some reference, extract the output-control information and send it to the playback-mode control section 912.

Then, the playback-mode control section 912 accepts the output-control information from the transfer control section 918. Sequentially, it compares and considers its contents and the present playback state (e.g., which playback mode is in operation, and a copy or a move). Thereby, it executes output control of this stream in the output control section 930. The operation of the playback-mode control section 912 will be described later in connection with the operation of the output control section 930.

Then, the transfer control section 918 sends the video stream from the temporary-storage memory 924 to the stream analysis section 926. It is sent in the sending timing which corresponds to each playback mode, for example, the double-speed playback, the quadruple-speed playback, the half-speed playback, or the like, or in the sending order of a GOP which corresponds to the reverse playback. For example, at the time of the reverse playback, the transfer control section 918 sends the GOP in reverse numerical order. Then, the stream analysis section 926 executes a stream analysis. According to the order which is applied to each playback mode, it sends each GOP to the decoder 928. Among the streams which have been read out to the temporary-storage memory 924, attribute information is to be analyzed in the stream analysis section 926. On the other hand, presentation data such as a video and an audio is sent to the decoder 928, and then, it is to be decoded.

The playback-mode control section 912 executes control so that the decoder control section 920 controls decoding by the decoder 928. According to the control by the decoder control section 920, the decoder 928 decodes the video stream which has been sent from the stream analysis section 926. The decoding by the decoder 928 differs in each encoding format, for example, an MPEG2, an MPEG4 or another format. In the example of FIG. 16, an MPEG2 is assumed. The stream which has been decoded by the decoder 928 is sent to the output control section 930, and then, it is to undergo output control.

As described already, for example, the final output-control information is created by the transfer control section 918 from: (a) copyright information which is encoded in a video stream, (b) copyright information on all contents which are recorded and stored in the management-information control section 916, or (c) information for controlling an output of some stream other than copyright information. Then, that information is sent to the playback-mode control section 912. Next, the playback-mode control section 912 compares and considers the information which has been sent from the transfer control section 918 and the present playback state which is managed by the playback-mode control section 912 itself. As a result, it overlays a stream to be outputted with each piece of copyright information, for example, "CopyNever", "CopyOnce", "CopyNoMore", or the like. and outputted from the output control section 930. Then, it allows the output control section 930 to output the stream.

As described above, based on copyright information on contents which are recorded in the record medium 922, the conventional HDD playback apparatus 900 plays a stream in the contents and executes output control for using the stream.

However, in the conventional HDD playback apparatus 900, it is the stream analysis section 926 that analyzes copyright information which is encoded in a video stream. In the transfer control section 918, the copyright information which has been analyzed and extracted by this stream analysis section 926 is collated with another piece of copyright information, or each of various pieces of information which relate to output control. Then, the final output-control information is created. Sequentially, that information is sent to the playback-mode control section 912. In the playback-mode control section 912, it is compared with the present playback state (e.g., a copy, or not a copy but a move). As a result of the comparison, the playback-mode control section 912 allows the output control section 930 to execute output control. This can easily cause temporal mismatching. Therefore, it will be difficult to reflect each picture or frame unit of copyright information which has been analyzed by the stream analysis section 926, precisely in a frame or picture unit, in output control by the output control section 930. This disadvantage is conspicuous in the case where the playback mode is a reverse playback (e.g., a playback which is referred to as a "reverse slow playback", and the like), or a normal or reverse fast playback which is executed by using only an I-picture.

For example, at the time of the reverse slow playback, a video stream which includes far more pictures than those of a video stream that is outputted from the output control section 930 is analyzed by the stream analysis section 926. Then, copyright information is extracted. Consequently, it is difficult to accurately decide which piece of copyright information is copyright information that corresponds to each picture of a video stream which is outputted from the output control section 930. In other words, it is more difficult to precisely extract output control which corresponds to each picture of a video stream which is outputted from the output control section 930 from copyright information on each picture, and executes the output control synchronously.

FIG. 17 shows a simplified example of the flow of the video stream and the copyright information at this time. FIG. 17 illustrates a case in which the reverse slow playback is executed at half the normal speed. In this example, first, the fourth GOP is requested by the transfer control section 918. Then, it is read from the temporary-storage memory 924 and sent to the stream analysis section 926. The stream analysis section 926 analyzes the sent stream and picks up copyright information. In addition, it sends video-stream data to the decoder 928.

Next, after double the processing cycle at the time of the normal playback elapses, the third GOP is sent from the temporary-storage memory 924 to the stream analysis section 926. However, in some cases, during a vacant period of time which is equivalent to one processing cycle of the normal playback, the following fifth GOP may be sent from the temporary-storage memory 924 to the stream analysis section 926. This fifth GOP is a GOP which does not require the reverse slow playback, and thus, it is not supposed to be outputted from the decoder 928. But the stream analysis section 926 often picks up copyright information and sends it the transfer control section 918.

Therefore, as shown in the right-hand end of FIG. 17, the flow of the detected copyright information is A-B-C-D-A-B-E-D-A. However, the video to be actually played is a video which is obtained by arranging each picture of each GOP from the fourth to the second in their reverse order. Hence, the copyright information on the stream to be played needs to be B-A-D-E. Nevertheless, the flow of the detected copyright information makes it extremely difficult to choose the necessary copyright information.

In contrast, for example, in the case where the fast playback is executed using only the I-picture, not the entire stream but only a part if the stream is frequently transferred from the temporary-storage memory 924 to the stream analysis section 926. This presents another disadvantage in that copyright information which is included in attribute information in a stream may not be transferred, so that the necessary copyright information cannot be detected.

In addition, since the decoder 928 has a limited storage capacity, in some cases, the whole GOP cannot be stored in the decoder 928, depending upon the data size of a GOP. In such a case, at the time of a general reverse playback including the reverse slow playback, in order for the decoder 928 to complete the decoding of the whole GOP, it has to repeatedly send the same GOP to the decoder 928. If there is a GOP to be sent in the temporary-storage memory 924, it may also be reused. On the other hand, unless there is such a GOP, it may also be read into the temporary-storage memory 924 and sent out. This causes the same copyright information to be repeatedly extracted from the same GOP. As a result, there is disadvantage in that the necessary copyright information cannot be properly selected.

BRIEF SUMMARY OF INVENTION

In view of the above described disadvantage, it is an object of the present invention to provide a playback art which is capable of precisely reflecting, in the output of a stream, attribute information such as copyright information in the stream, even in a special playback mode, such as a reverse slow playback, a fast playback and a reverse playback.

In order to resolve the above described disadvantage and attain the object, one aspect of the present invention is directed to a playback apparatus to which a record medium is connected. The apparatus comprises: a memory; a reading section which reads, from the record medium to the memory, a stream that is a data row which includes encoded presentation data and attribute information on the presentation data, the presentation data and the attribute information being multiplexed in the data row; a separation section which separates the presentation data from the stream that has been read to the memory; a decoding section which decodes the separated presentation data; an output section which outputs the decoded presentation data; an extraction section which extracts the attribute information from the stream that has been read to the memory; a time specification section which specifies a presentation time for the presentation data that corresponds to the extracted attribute information; a table creation section which creates a table in which the presentation time and the attribute information are recorded so as to correspond to each other; and a reflection section which, referring to the table, reflects the attribute information in an output of the presentation data by the output section at a specific time that is indicated by the corresponding presentation time.

According to this configuration, attribute information such as copyright information in a stream can be precisely reflected in the output of the stream, even in a special playback mode, such as a reverse slow playback, a fast playback and a reverse playback.

These and other objects, features and advantages of the present invention will become more apparent upon reading of the following detailed description along with the accompanied drawings.

BRIEF DESCRIPTION OF THE DRAWINGS

FIG. 6 is a representation, showing the structure of a PMT based on the standard of an MPEG2-TS.

FIG. 8 is a table, illustrating the ES number in the management information of FIG. 7.

FIG. 10 is a flow chart, showing an example of a procedure for creating a copyright table.

FIG. 11 is a table, illustrating the copyright table which is created in the procedure of FIG. 10.

FIG. 13 is a flow chart, showing an example of still another procedure for creating the copyright table.

FIG. 14 is a flow chart, showing an example of still another procedure for creating the copyright table.

FIG. 15 is a table, illustrating the copyright table which is created in any of the procedures of FIG. 12 to FIG. 14.

DETAILED DESCRIPTION OF INVENTION

Hereinafter, a playback apparatus according to each preferred embodiment of the present invention will be described with reference to the drawings.

An Embodiment

Figure 1:
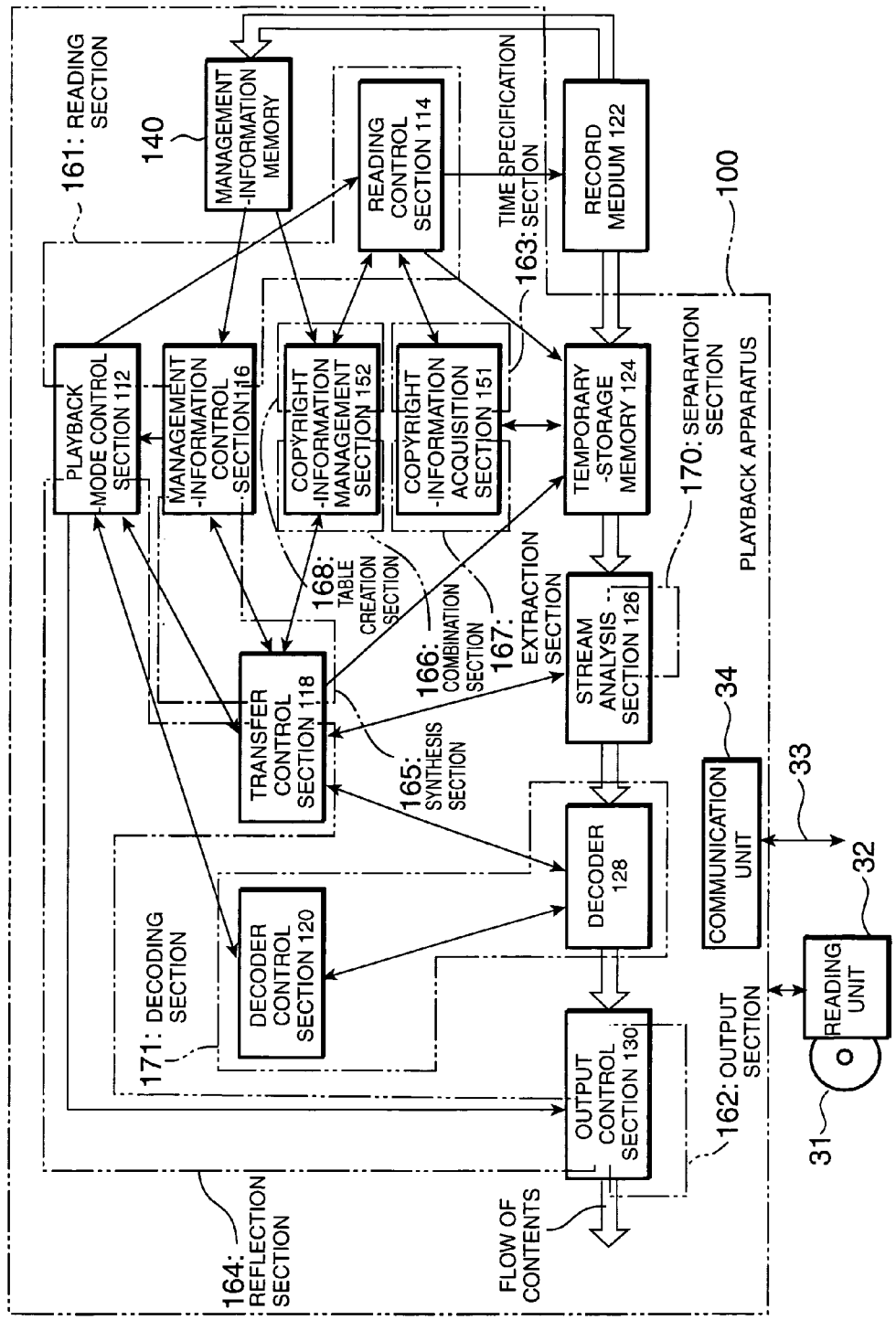
FIG. 1 is a block diagram, showing the configuration of a playback apparatus according to an embodiment of the present invention.

FIG. 1 is a block diagram, showing the configuration of a playback apparatus according to an embodiment of the present invention. Such a playback apparatus 100 is configured as a BLU-RAY DISC (optical and magneto-optical disc players and recorders for audio, video and computer data; blank optical and magneto-optical discs, pre-recorded optical and magneto-optical discs featuring music, text data, still images and motion pictures; televisions; video cameras; digital still cameras; computers; digital satellite broadcasting systems, namely receivers, transmitters and antennas for satellite broadcasting; video game machines for use with televisions) playback apparatus. It includes: a playback-mode control section 112; a reading control section 114; a management-information control section 116; a transfer control section 118; a decoder control section 120; a temporary-storage memory 124; a stream analysis section 126; a decoder 128; an output control section 130; a management-information memory 140; a copyright-information acquisition section 151; and a copyright-information management section 152. Some of the component elements of the playback apparatus 100 each have the same name as the component elements of the conventional HDD playback apparatus 900. These component elements each have a common basic operation to those of the conventional HDD playback apparatus 900. Hence, a detailed description is omitted about their basic operations. Besides, the characteristic operation of each element will be described in the following operational description.

A record medium 122 corresponds to an embodiment of the record medium according to the present invention. In addition, the temporary-storage memory 124 corresponds to an embodiment of the memory or the first memory according to the present invention. Besides, a part of the reading control section 114 and the playback-mode control section 112, and a part of the management-information control section 116, configure a reading section 161 which corresponds to an embodiment of the reading section according to the present invention. A part of the stream analysis section 126 configures a separation section 170 which corresponds to an embodiment of the separation section according to the present invention. The decoder 128 and the decoder control section 120 configure a decoding section 171 which corresponds to an embodiment of the decoding section according to the present invention. A part of the output control section 130 configures an output section 162 which corresponds to an embodiment of the output section according to the present invention. A part of the copyright-information acquisition section 151 configures an extraction section 167 which corresponds to an embodiment of the extraction section according to the present invention. Another part of the copyright-information acquisition section 151 configures a time specification section 163 which corresponds to an embodiment of the time specification section according to the present invention.

A part of the copyright-information management section 152 configures a table creation section 168 which corresponds to an embodiment of the table creation section according to the present invention. Another part of the copyright-information management section 152 configures a combination section 166 which corresponds to an embodiment of the combination section according to the present invention. A part of the playback-mode control section 112, a part of the transfer control section 118 and a part of the output control section 130 configure a reflection section 164 which corresponds to an embodiment of the reflection section according to the present invention. In addition, a part of the management-information control section 116 and a part of the transfer control section 118 configure a synthesis section 165 which corresponds to an embodiment of the synthesis section according to the present invention. Finally, the management-information memory 140 corresponds to an embodiment of the second memory according to the present invention.

Each apparatus element of the playback apparatus 100 may also be configured by hardware which needs no computer program. However, it is simpler and easier to configure them by a computer such as a micro computer in which a computer program is installed. Such a computer includes: a CPU (or central processing unit: not shown); a RAM (or random access memory: not shown) or a ROM (or read only memory: not shown) where a computer program is stored which defines the operation of this CPU; and a storage section such as a RAM (not shown) which stores data temporarily.

The above described computer program can be provided via a program recording medium 31, such as a ROM, a flexible disk and a CD-ROM. It can also be provided through a transmission medium 33, such as a telephone line and a network. In FIG. 1, a CD-ROM is shown as the program recording medium 31, and a telephone line is shown as the transmission medium 33.

A CD-ROM reading unit 32 as an external unit is connected to the playback apparatus 100. Thereby, the computer program can be read out which is recorded in the CD-ROM as the program recording medium 31. Then, it can be stored in a storage unit (not shown), such as an RAM and a hard disk, which is provided in the playback apparatus 100. In the case where a program is provided in the form of a ROM as the program recording medium 31, that ROM is mounted in the playback apparatus 100. Thereby, the playback apparatus 100 can execute the processing according to the computer program.

The program which is provided via the transmission medium 33 is received through a communication unit 34. Then, it is stored in a storage unit (not shown), such as a RAM and a hard disk, which is provided in the playback apparatus 100. The transmission medium 33 is not limited to a wired transmission medium. It may also be a radio transmission medium. Besides, the transmission medium 33 includes not only a communication line but also a relay unit.

The playback apparatus 100 can be used by attaching the record medium 122 which is an attachable and detachable BLU-RAY DISC. Herein, the playback apparatus according to the present invention is not limited to a BLU-RAY DISC playback apparatus. It can also be applied to another type of playback apparatus, such as a DVD playback apparatus and a hard-disk drive playback apparatus.

The playback apparatus 100 can play contents from the record medium 122 in various modes. In the playback apparatus 100, as its playback mode, there are a normal playback, as well as a special playback, such as a reverse slow playback, a reverse fast playback, a reverse normal-speed playback, a normal-direction fast playback and a normal-direction slow playback. The control of each section of the playback apparatus 100 in each playback mode is executed by the playback-mode control section 112. Hereinafter, as an example, the processing at the time of the reverse slow playback is mainly described. However, the same processing can be executed, even in another playback mode.

Figure 2:
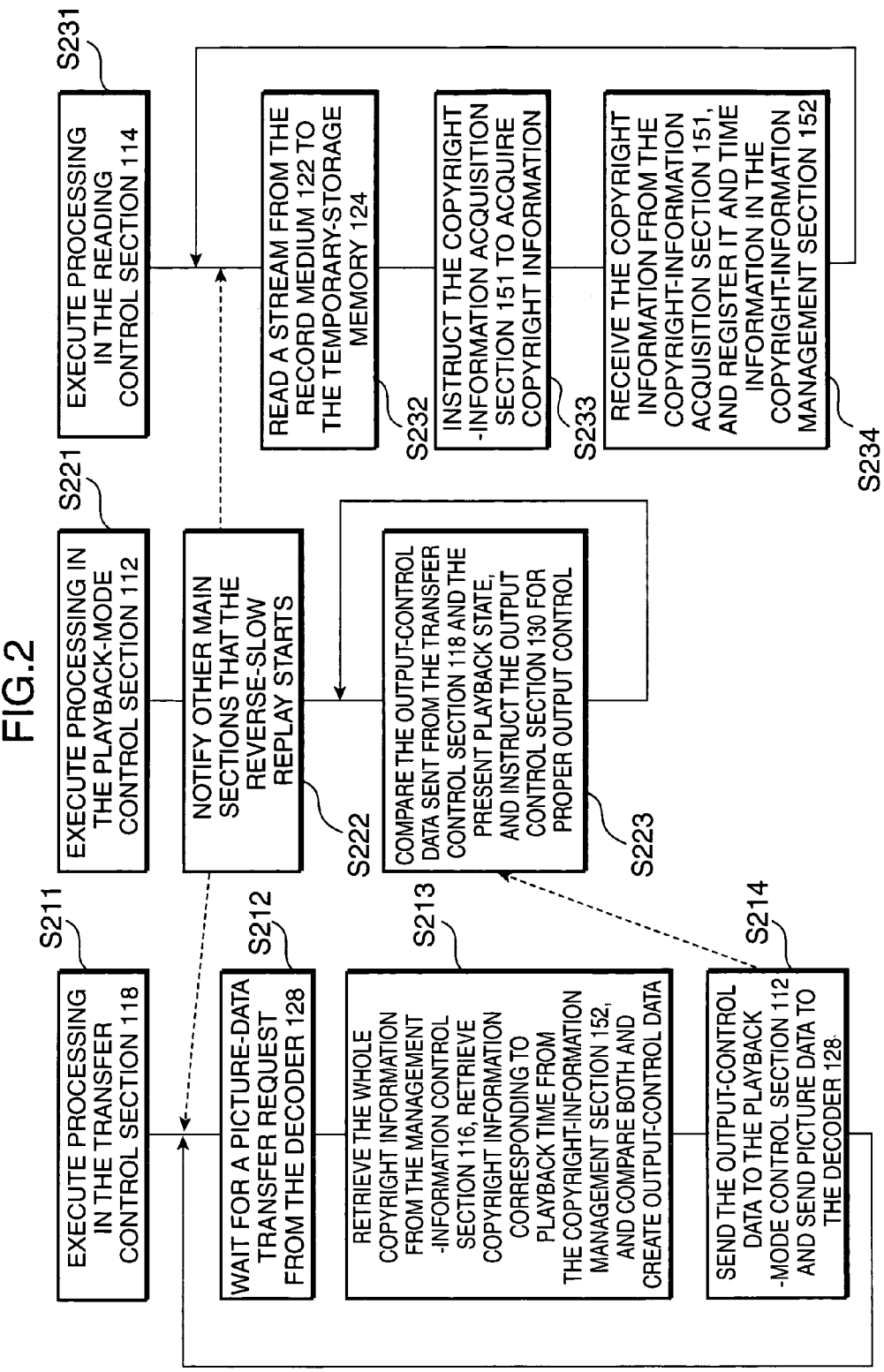
FIG. 2 is a flow chart, showing a processing procedure of the apparatus of FIG. 1.

FIG. 2 is a flow chart, showing the flow of a main processing by the playback apparatus 100 when the playback mode is the reverse slow playback. The processing which is executed by the playback-mode control section 112 is shown in the flow of a step S221 and the following steps in FIG. 2. First, a user operates the playback apparatus 100, some program controls it, an external unit controls it through an interface (not shown), or another unit instructs it. Thereby, the reverse slow playback by the playback apparatus 100 starts with control by the playback-mode control section 112 (in a step S221).

When the reverse slow playback starts, first, the playback-mode control section 112 notifies other main sections which configure the playback apparatus 100 that the reverse slow playback starts (in a step S222). In FIG. 2, only the transfer control section 118 and the reading control section 114 are notified. However, in addition to these sections, a notification may also be given to another section, such as the decoder control section 120 and the output control section 130. The case where a notification is given to other such sections is assumed below.

The reading control section 114 is notified from the playback-mode control section 112 that the reverse slow playback starts. Then, it executes the processing of the flow of a step S231 and the following steps in FIG. 2. In the timing and the order necessary for executing the reverse slow playback, the reading control section 114 reads a stream which makes up contents from the record medium 122 to the temporary-storage memory 124 (in a step S232). Next, the reading control section 114 instructs the copyright-information acquisition section 151 to retrieve copyright information from the stream which has moved to the temporary-storage memory 124 (in a step S233).

Figure 3:
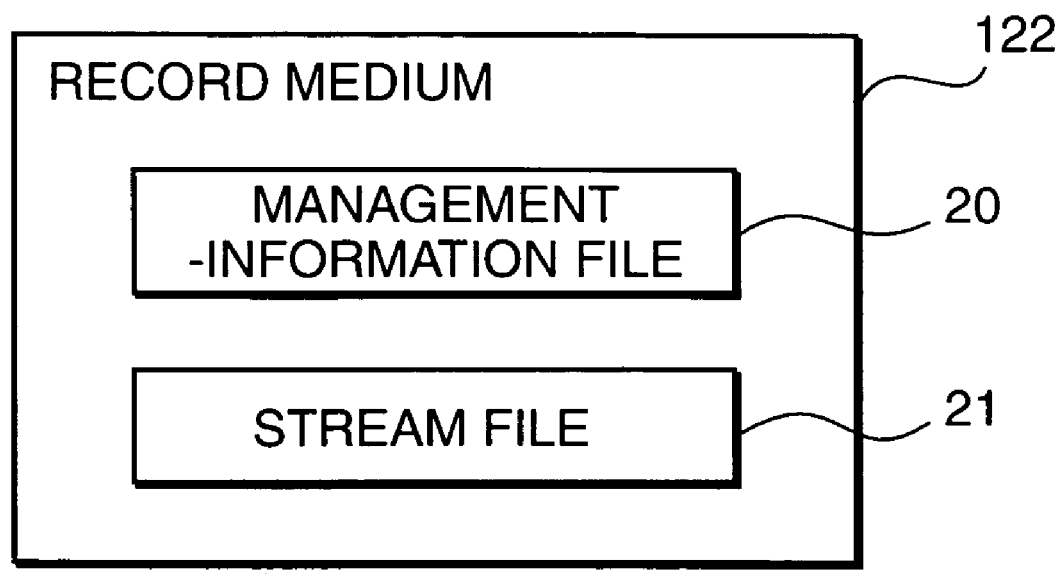
FIG. 3 is a representation, showing a form in which contents are stored in a record medium of FIG. 1.

As shown in FIG. 3, in the record medium 122, a management-information file 20 and a stream file 21 are recorded and read out. The management-information file 20 is a file which stores management information. The stream file 21 stores a stream which includes presentation data that is compressed and encoded, such as a video and an audio, and attribute information such as copyright information on the presentation data and the like, after they have been multiplexed. A stream which is stored in the stream file 21 is encoded, for example, according to the standard of an MPEG2 or an MPEG4. It has a data structure in the transport-stream format. The transport stream is described, using its acronym, as "TS". Herein, data and information is both a signal as a physical entity. In that respect, the former is not different from the latter. However, in this specification, essentially, the presentation data is referred to as "data", and data except it or information is referred to as "information".

In the same way as the conventional HDD playback apparatus 900, when contents are recorded in the record medium 122, or when they are read from the record medium 122 and played, both the stream file 21 and the management-information file 20 are recorded and played. In further detail, when contents are recorded in the record medium 122, the management-information control section 116 generates management information, based on various types of information which are included in a stream. Then, it stores the management information in the management-information file 20 and records it in the record medium 122. When contents are read from the record medium 122, first, the reading control section 114 reads out the management-information file 20 in a lump to the management-information memory 140. Thereafter, the reading control section 114 reads out a stream in the stream file 21, one after another, to the temporary-storage memory 124. Hence, before a stream is read out in the step S232, the management-information file 20 is read out.

Figure 4:
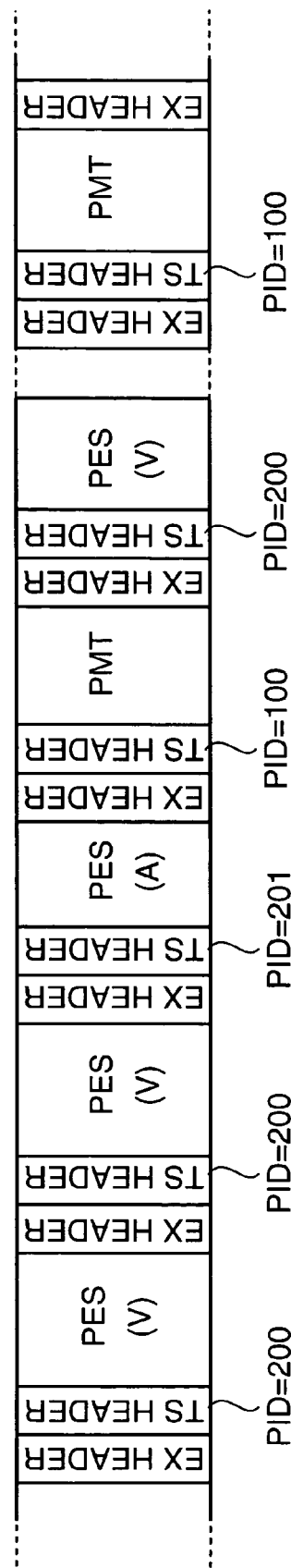
FIG. 4 is a representation, showing the data structure of a stream which is stored in a stream file of FIG. 3.
Figure 5:
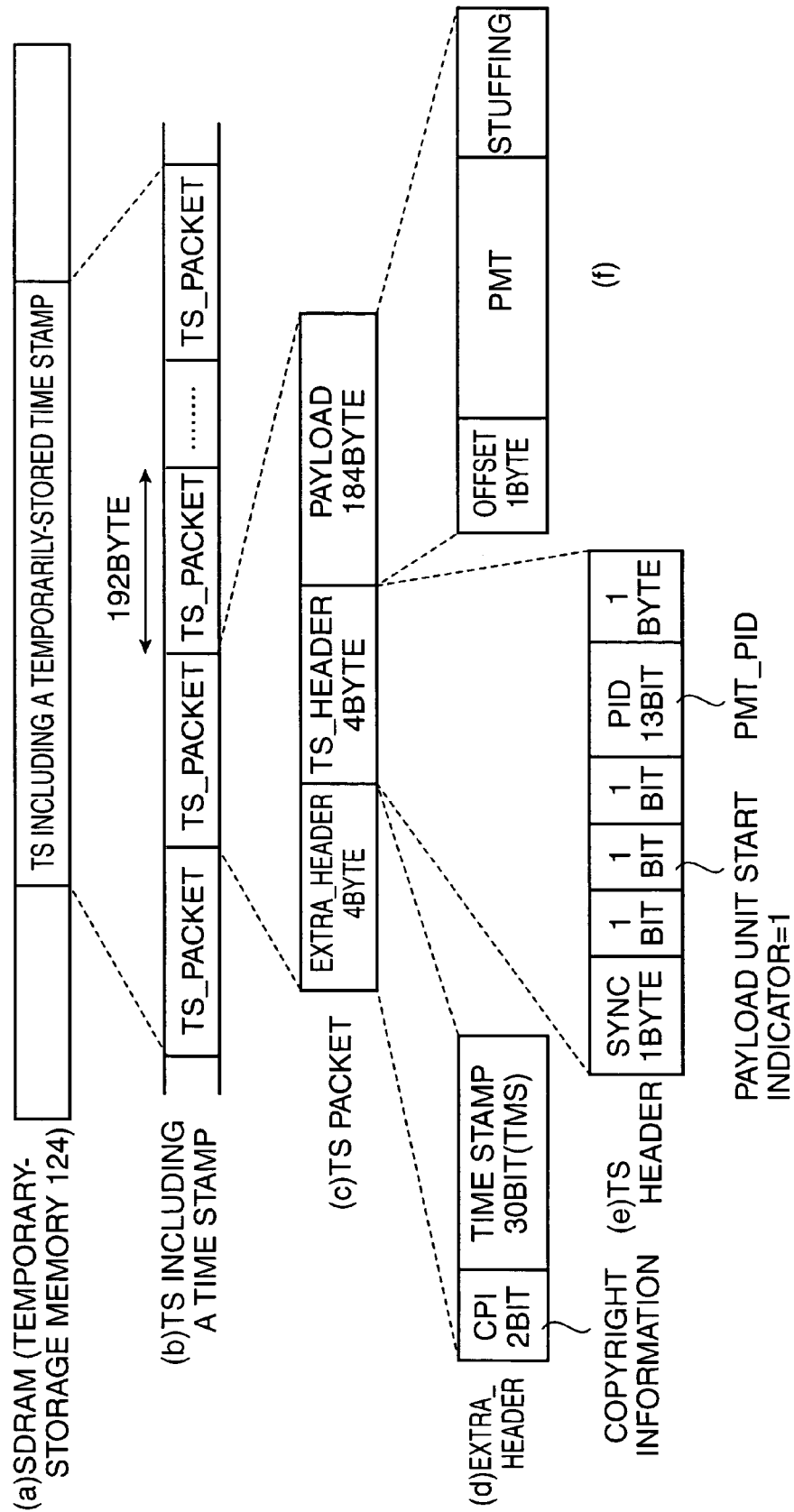
FIG. 5 is a representation, showing a detailed data structure of the stream of FIG. 4.

FIG. 4 and FIG. 5 are each a representation, showing the data structure of a stream which is stored in the stream file 21. FIG. 4 shows the structure of the whole stream, and FIG. 5 shows a detailed structure of the stream. FIG. 5 shows, especially, a part of the stream which is temporarily stored in the temporary-storage memory 124. A transport stream is made up of a group of TS packets. The size of a TS packet which is defined in MPEG 2-TS is 188 bytes. However, for example, if a 4-byte extended header (i.e., an extra_header or an EX header) is added to the head of a TS packet, it can be 192 bytes in total.

The TS packet has a 4-byte-long TS header and a 184-byte-long payload. The TS header includes information on multiplexing, or the like. More specifically, the TS header includes a 1-byte sync, a 1-bit "pay load unit start indicator", and a 13-bit PID. The PID (or packet identifier) is an identifier which identifies a TS packet.

The payload carries presentation data, such as a video, an audio and a caption, in the form of a PES (or pack of elementary stream). It also carries attribute information such as a PMT in the form of section data. In other words, the presentation data and the attribute information are incorporated and multiplexed in a stream in the unit of a TS packet. In the stream, the part which is made up of the presentation data such as a video and an audio and a caption is called an elementary stream (or ES). PES designates the packet of an ES. The TS packet has a fixed length, and thus, the PES which is placed and carried on the payload each by the TS packet is generally a division of a single PES. The TS packet carries a plurality of pieces of ES which correspond to a plurality of pieces of presentation data, such as a video and an audio. Thereby, multiplexing can be realized. Besides, in order to realize a multi-view, several pieces of ES which correspond to several pictures can be multiplexed.

In the TS packet which places and carries the PES on the payload, an ES-PID as a PID is given to the TS header. The ES-PID is an identifier which identifies a multiplexed ES. Using the ES-PID, which of a video, an audio and character data the ES that is carried by the payload corresponds to, or which of individual videos that make up a multi-view it corresponds to, can be identified. The value of the ES-PID is defined in the PMT. In the example of FIG. 4, "200" is given to the ES-PID of the TS stream which carries the ES that corresponds to a video. On the other hand, "201" is given to the ES-PID of the TS stream which carries the ES that corresponds to an audio.

In order to avoid confusion, the entire stream which is made up as the group of TS packets, or the whole stream which is stored in the stream file 21, are described as the stream or the TS stream. In addition, an elementary stream (or ES) which corresponds to each piece of presentation data such as a video, is described as the ES.

When the payload carries the PMT, the PID which is given to the TS header becomes a PMT-PID. The PMT-PID is an identifier which identifies the TS packet that carries the PMT. The TS packet includes what places and carries a PAT on the payload. The PMT-PID is defined inside of the PAT. In the example of FIG. 4, "100" is given to the PMT-PID. The PAT-PID which is the PID of the TS packet that carries the PAT is set in advance at a value of "0x0000" in the ISO/IEC13818-1 standard. Therefore, in order to search for a certain ES, using the PAT-PID which is promised beforehand as a clue, the TS packet that carries the PAT is sought. Then, using, as a clue, the ES-PID which is described in the PMT, the TS packet that carries the objective ES is sought. When the payload carries the PMT, the payload is made up of a 1-byte offset, and a PMT, stuffing which stuffs the remaining data length.

The EX header can include copyright information, timing in receiving a TS packet, or another piece of information. Hereinafter, unless there is especially any misinterpretation, the TS packet means a form in which the EX header is added. Herein, according the present invention, the TS packet has an optional form, and thus, its size (i.e., the number of bytes) is arbitrary. In addition, in this embodiment, the leading 2 bits of the EX header is designed to be a CPI (or copy permission indicator) which is a type of copyright information. The remaining 30 bits is designed to be a time stamp (or TMS) which describes timing in sending out the TS packet. The CPI is copyright information which is used for output control. When the playback apparatus 100 records contents in the record medium 122, it writes, as the TMS, the timing in receiving the TS packet. The TMS is used to send out, in precise timing, the TS packet to which it is attached.

FIG. 6 is a representation, showing the structure of a PMT based on the standard of an MPEG2-TS. In FIG. 6, the PMT is expressed in a data description language. The PMT's data structure itself is conventionally known as a part of the standard of the MPEG2-TS. Thus, it is only described roughly. Herein, as the structure of the PMT, another form can be used which is different from the form which is defined in the MPEG2-TS.

The PMT includes table_id (or table ID), PCR_PID, Elementary_PID (i.e., the above described ES-PID), and the like. In addition to those, as an area in which specific information is described, it includes a descriptor in a first loop and a descriptor in a second loop. The table ID is an identifier which identifies the type of data that is mounted on a payload. The PCR-PID is a PID which identifies a TS packet that holds a PCR (or program clock reference) which is time information for correcting the time of an STC (or system time clock) that is a clock (not shown) provided in the playback apparatus 100 which corresponds to a decoder in the standard of the MPEG2-TS. The STC ticks the time away, synchronously with the PCR. It is defined in the standard of the MPEG2-TS. The PCR corresponds to an SCR (or system clock reference) in an MPEG2-PS. However, the PCR can be defined separately and independently for each multiplexed program. In that respect, it is different from the SCR.

Various kinds of information can be included in the descriptor. As one form, copyright information can be included in both the descriptor in the first loop and the descriptor in the second loop. For example, a DTCP (or digital transmission content protection) descriptor can be included in the first loop. The DTCP descriptor is a kind of copyright information. In the second loop, the DTCP descriptor can also be included, and in addition, a digital copy control information descriptor (or CCI) can also be included in the second loop. These are all equivalent to copyright information. As described already, as the copyright information, the CPI can also be included in the EX header of the TS packet.

The CCI expresses, for example, "CopyFree", "CopyNoMore", "CopyOnce" and "CopyNever", using 2-bit data (0, 0), (0, 1), (1, 0) and (1, 1), respectively.

As the copyright information to be reflected in the output of a stream, the playback apparatus 100 can use one of those pieces of copyright information. Besides, some or all of them can also be combined and used. As the form of combining some or all of them, there are a form in which the strictest copyright information is adopted, a form in which the most lenient copyright information is adopted, a form in which the average copyright information is adopted, a form in which a reference is set based on which any piece of copyright information should be chosen according to some condition and a decision is made according to such a reference, and the like. Such a combination is executed by the copyright-information management section 152 (see FIG. 1) as the combination section 166. The copyright-information management section 152 as the table creation section 168 creates a table in which the copyright information which has been obtained by the combination and the presentation time are recorded so that they correspond to each other. In contrast, before they are combined, the copyright-information management section 152 may also create a table in which several pieces of copyright information are recorded so that each of them corresponds to the presentation time. In the latter case, the transfer control section 118 (described later) refers to the copyright table and acquires each piece of copyright information which corresponds to the presentation time. Thereafter, the combination section 166 combines the acquired pieces of copyright information. In this case, different from FIG. 1, the combination section 166 configures a part of the transfer control section 118.

Returning to FIG. 2, the reading control section 114 instructs the copyright-information acquisition section 151 to pick up copyright information. Then, the copyright-information acquisition section 151 extracts the copyright information from the stream which has been read out to the temporary-storage memory 124 (in a step S234). The method of extracting the copyright information varies according to the following forms. They are a form where the copyright information which is included in the PMT is used, and a form where the copyright information which is included in the other part of the TS packet is used. For example, in the form where the copyright information which is included in the PMT is used, the copyright-information acquisition section 151 retrieves the PMT from the payload of the TS packet. Then, it analyzes the configuration contents shown in FIG. 6, and acquires the copyright information described by the DTCP descriptor or the digital copy control information descriptor, which is included in the PMT.

On the other hand, for example, in the form where the CPI which is included in the EX header of the TS packet is used as the copyright information for output control, the copyright-information acquisition section 151 does not analyze the payload of the TS packet. Instead, it analyzes the EX header and retrieves, as the copyright information, the CPI which is included in it. In contrast, in the form where both the copyright information which is included in the PMT and the CPI which is included in the EX header of the TS packet is used as the copyright information for output control, the copyright-information acquisition section 151 analyzes and extracts both of these and acquires them. In this way, the copyright-information acquisition section 151 acquires the copyright information which is included in the TS packet. Herein, a detailed description will later be given about a processing procedure in which the copyright-information acquisition section 151 extracts the copyright information.

In the step S234, based upon the instruction from the reading control section 114, the copyright-information acquisition section 151 as the extraction section 167 extracts the necessary copyright information from the stream which is stored in the temporary-storage memory 124. At the same time, as the time specification section 163, it also extracts time information such as a time stamp. If the reading control section 114 accepts these pieces of information, it allows the copyright-information management section 152 to record them so that they correspond to each other. More specifically, based on the accepted time information and copyright information, the copyright-information management section 152 creates and holds a copyright table in which they are recorded so as to correspond to each other. The copyright-information management section 152 has a built-in memory (not shown) for holding the copyright table. Such a memory may also be the management-information memory 140, or a partial storage area of another memory which is provided in the playback apparatus 100. The copyright-information management section 152 accepts the time information and the copyright information via the reading control section 114. Instead, based upon the instruction by the reading control section 114, it may also accept such information directly from the copyright-information acquisition section 151. The reading control section 114, the copyright-information acquisition section 151 and the copyright-information management section 152 repeatedly execute the processing of the steps S232 to S234.

In the step S222, as described above, the playback-mode control section 112 notifies the transfer control section 118, the reading control section 114, or the like, that the reverse slow playback starts. Then, it also gives the same notification to the decoder control section 120. As the flow of a control signal is shown by an arrow in FIG. 1, after receiving this notification, the decoder control section 120 specifies the TS packet necessary for realizing the reverse slow playback, based on the presentation time expressed by the PTS. Then, it instructs the decoder 128 to decode the TS packet. After receiving this instruction, the decoder 128 requests the transfer control section 118 for the specified TS packet.

The transfer control section 118 is waiting for a data transfer request from the decoder 128 (in a step S212). When it receives the data transfer request from the decoder 128, it reads the designated TS packet from the specified TS packet. Then, it sends it to the stream analysis section 126. Sequentially, from the management-information memory 140 through the management-information control section 116, the transfer control section 118 retrieves the whole or a part of the contents, or the copyright information which corresponds to each part thereof (in the first paragraph of a S213). In the management-information memory 140, the whole or a part of the contents, or the copyright information on each part thereof is recorded and stored as a part of the management information. This is the same as the case where such information is recorded and stored in the management-information control section 916 of the conventional HDD playback apparatus 900. In other words, the copyright information on the whole contents is copyright information which is not the unit of a TS packet and covers all the TS packets.

Next, the transfer control section 118 retrieves, from the copyright-information management section 152, the copyright information which corresponds to the time information on the requested TS packets (in the second paragraph of the S213). More specifically, the transfer control section 118 refers to the copyright table which is created and held by the copyright-information management section 152. Thereby, it acquires the copyright information which corresponds to the presentation time of the requested TS packets Sequentially, as the synthesis section 165, the transfer control section 118 compares and considers the copyright information on the whole contents which have been retrieved through the management-information control section 116, and the copyright information which corresponds to the time information on the TS packets which have been retrieved from the copyright-information management section 152. Then, according to some reference, it generates information for output control (hereinafter, referred to as the "output-control information"). In short, the transfer control section 118 as the synthesis section 165 combines several kinds of copyright information and generates the output-control information. As the reference for generating the output-control information, for example, there can be set a reference on which the strictest one of various pieces of copyright information is extracted, or a reference on which the most lenient one is extracted. Or, if each piece of copyright information defines the number of times up to which a copy can be made, a reference can be decided using some function on the number of times. In other words, such a reference can be set arbitrarily.

The transfer control section 118 sends, to the playback-mode control section 112, the output-control information which it has generated. In contrast, the transfer control section 118 may also send, to the playback-mode control section 112, each piece of copyright information as it is (in the former part of a S214). If each piece of copyright information is sent, as it is, to the playback-mode control section 112, then the output-control information is generated by the playback-mode control section 112, or by another apparatus section. In this case, the synthesis section 165 is configured by the playback-mode control section 112 or by another apparatus section.

Simultaneously with the above described processing, the stream analysis section 126 analyzes the TS packet in which a video, an audio and another piece of information are multiplexed. Then, it separates a video, an audio or another piece of information. The stream analysis section 126 executes such a separation, and based on the control by the transfer control section 118, it sends, to the decoder 128, the TS packet which carries the presentation data such as a video and an audio which is requested from the decoder 128 (in the latter part of the S214). In other words, from among the TS packets in the stream, the stream analysis section 126 separates a TS packet which carries attribute information such as a PMT in the form of section data and a TS packet which carries presentation data in the PES form. Then, it is to analyze the former, and sends the latter to the decoder 128.

The decoder 128 receives the presentation data in the TS-packet form. Then, it executes necessary decoding, specifically, expands and decodes the presentation data such as video and audio information which is compressed and encoded in the format of MPEG2, MPEG4 or the like. The TS packet which has been decoded by the decoder 128 is sent to the output control section 130. Then, it is overlaid with usage restriction information based on the copyright information, and then, it is outputted. The processing by the output control section 130 will be described later.

The transfer control section 118, the decoder control section 120, the stream analysis section 126 and the decoder 128 repeatedly execute the processing of the steps S212 to S214.

On the other hand, the playback-mode control section 112 receives the output-control information which has been created by the transfer control section 118. Then, it compares its contents and the present playback state, and executes proper output control of the output control section 130 (in a S223). In the form where the output-control information is not created by the transfer control section 118, the output-control information may also be created by the playback-mode control section 112. The output-control information is managed by the output-control information, in a state where it corresponds to the presentation time of each TS packet which has a PTS as its example.

The output-control information not necessarily rigorously corresponds to the presentation time. However, the output-control information needs to be controlled synchronously with the transmission of a TS packet. Hence, in order to specify the output-control information which corresponds to a TS packet to be outputted from now, it has to correspond to the presentation time (or an approximate value of the presentation time). From the playback-mode control section 112, the output-control information which corresponds to the presentation time of each TS packet is sent to the output control section 130, in suitable timing and with proper contents according to the playback state which includes each playback mode. Then, an instruction for appropriate output control is given to the output control section 130 (in the step S223).

For example, the playback-mode control section 112 compares and considers the output-control information which has been sent from the transfer control section 118, and the present playback state which the playback-mode control section 112 itself manages. As a result, it controls the output control section 130, so that the presentation data to be outputted is overlaid with various kinds of copyright information, for example, usage restriction information such as "CopyNever", "CopyOnce" and "CopyNoMore", and then, it is outputted.

In addition, if another example is given, the copyright information which corresponds to the TS packet of a video stream, which is equivalent to the presentation time to be outputted from now, is "A". The "A" indicates "CopyOnce". If the present state which is controlled by the playback-mode control section 112 is the normal playback, this video stream is overlaid with the copyright information of "CopyNoMore". Then, it is outputted from the output control section 130. Or, let's assume the copyright information which corresponds to the TS packet of a video stream to be outputted from now is "B", and that the "B" indicates, for example, "CopyNoMore". In that case, if the present state which is controlled by the playback-mode control section 112 is the normal playback, this video stream is overlaid with the copyright information of "CopyNever". Then, it is outputted from the output control section 130.

As the form in which the output control section 130 multiplexes the presentation data and attribute information such as copyright information, various forms can be adopted. For example, in the case where the output control section 130 outputs decoded presentation data in an analog form so that it can be inputted in a television receiver, a form can be used where the attribute information is placed on a carrier wave which has a different frequency from that of a carrier wave that carries the presentation data. In the case where the output control section 130 outputs decoded presentation data to the outside in a digital form through a digital communication interface, similarly to the MPEG2-TS, a form can be used where the presentation data and the attribute information are multiplexed in a packet unit.

The form of output control is not limited to the above described examples. For example, there can be a case where on some condition, copyright information which entirely prohibits using a certain TS packet of a video stream corresponds to such a TS packet. In that case, the playback-mode control section 112 may also prohibit the output control section 130 from exactly outputting the video stream. Besides, the copyright information may also be the one except the already described four kinds.

Using the above described processing, even at the time of a special playback, such as a fast playback, a slow playback and a reverse playback, output control of a stream based on copyright information can be precisely executed in the unit of each TS packet. In further detail, needless to say, at the time of a normal playback, as well as a fast playback, a slow playback, a reverse playback, their combination and each type of special playback, output control can be executed which accurately reflects the output-control information such as the copyright information which is encoded simultaneously with a video stream. In addition, as its secondary effect, separately from a video stream, even if there is no copyright information on the whole contents, necessary copyright management can be accurately realized.

Furthermore, even if there is not a single piece of copyright information, but several pieces of copyright information, each piece of copyright information can be taken into account. This helps precisely manage copyrights. Therefore, even if a part of several pieces of copyright information is falsified, the output control based on the copyright information can be maintained at the maximum. Moreover, not only according to copyright information, but also according to another piece of attribute information or the like which corresponds to a stream, or both another piece of attribute information and the copyright information, output management can most accurately be executed.

Next, an example of the procedure for creating a copyright table will be described in detail.

(Copyright-Table Creation Example 1)

Figure 7:
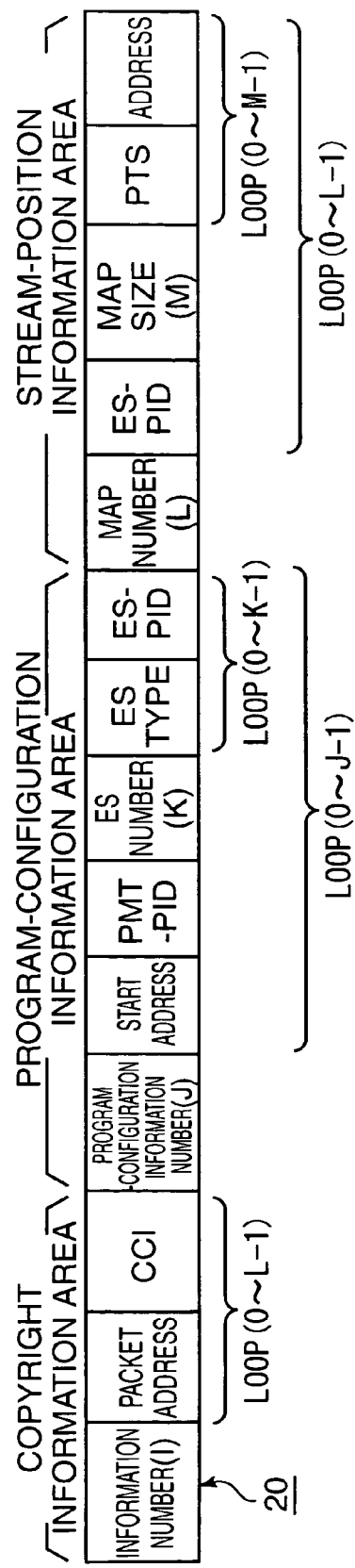
FIG. 7 is a representation, showing the data structure of management information which is stored in a management-information file of FIG. 3.

FIG. 7 is a representation, showing the data structure of the management-information file 20 which is recorded together with the stream file 21 in the record medium 122. The management-information file 20 includes a copyright information area, a program-configuration information area, and a stream-position information area. In the copyright information area, there is recorded a CCI for an information number I. Furthermore, in the copyright information area, among TS packets that make up a stream which is stored in the stream file 21, an address in the record medium 122 of the TS packet in which each CCI first becomes effective is recorded as a packet address for each CCI. The address of the TS packet is expressed, for example, by an address in which the first record unit (e.g., 1 byte) of the TS packet is recorded, in other words, by the leading address of the TS packet. Herein, in the copyright information area, the maximum number of the information number is often defined according to standards.

In the program-configuration information area, information on a PMT is recorded. Specifically, in the program-configuration information area, there are recorded a program-configuration information number (J) which is the total number in the whole stream of a PMT which has different contents, as well as, with respect to each variable j where j=0 to J−1, a start address, a PMT-PID, and an ES number (K). Herein, the start address is an address of the TS packet in which the jth PMT first becomes effective. The PMT-PID is a PID which identifies the TS packet which carries the jth PMT. The PMT-PID can be set at a different value for each variable j. However, it can also be set at a value which does not depend upon the variable j. The ES number is the number of ES (or elementary streams) that is included in the program which is described in the jth PMT.

FIG. 8 shows an example of the ES number. In the example of FIG. 8, a program provides a multi-view. In this example, in a stream section (which is expressed as the "section which corresponds to the variable j=0") where the PMT which corresponds to the variable j=0 is effective, the program has three video streams V1 to V3. In the section which corresponds to the variable j=1, the program has two video streams V1, V2. In the example of FIG. 8, in the section which corresponds to the variable j=0, K=3. In the example of FIG. 8, in the section which corresponds to the variable j=1, K=2.

Moving back to FIG. 7, moreover, in the program-configuration information area, with respect to each variable k where k=0 to K−1, an ES type and an ES-PID are recorded. A loop of the variable k=0 to K−1 is formed as a nest inside of a loop of the variable j=0 to J−1. The ES type is a type of an ES which corresponds to the variable k. For example, it represents a type such as video and audio. In the example of FIG. 8, in the section which corresponds to the variable j=0, the type of an ES which corresponds to the variable k=0 to 2 is all a video stream. Moving back again to FIG. 7, the ES-PID is a PID that identifies the TS packet which carries an ES that corresponds to the variable k.

In the stream-position information area, information is recorded which defines the relation between the time of a TS packet and the position on the stream. Specifically, in the stream-position information area, a map number (L) is recorded which is the number of streams that has time information. In addition, with respect to each variable l where l=0 to L−1, an ES-PID and a map size (M) are recorded. Herein, the ES-PID is a PID that identifies the TS packet which carries an ES that corresponds to the variable l. The stream which has time information is ordinarily a video stream. In the example of FIG. 8, in the section which corresponds to the variable j=0, video views V1 to V3 correspond to the variable l=0 to 2. In the section which corresponds to the variable j=1, video views V1, V2 correspond to the variable l=4, 5. Moving back to FIG. 7, with respect to the ES that corresponds to each variable l, the map size (M) is the number of GOP (or groups of picture) that belong to the section which corresponds to each variable j.

Furthermore, in the stream-position information area, with respect to each variable m where m=0 to M−1, there are recorded a PTS (or presentation time stamp) and an address. A loop of the variable m=0 to M−1 is formed as a nest inside of a loop of the variable l=0 to L−1. The PTS is attached to the header of a PES or the PES header which is placed on the payload of a TS packet, and designates time for the decoder to present an ES, or presentation time. It represents the presentation time of a GOP which corresponds to the variable m. The address is an address on the record medium 122 of the GOP which the PTS indicates. For example, it is the leading address of the GOP. This address represents the address of the GOP.

Figure 9:
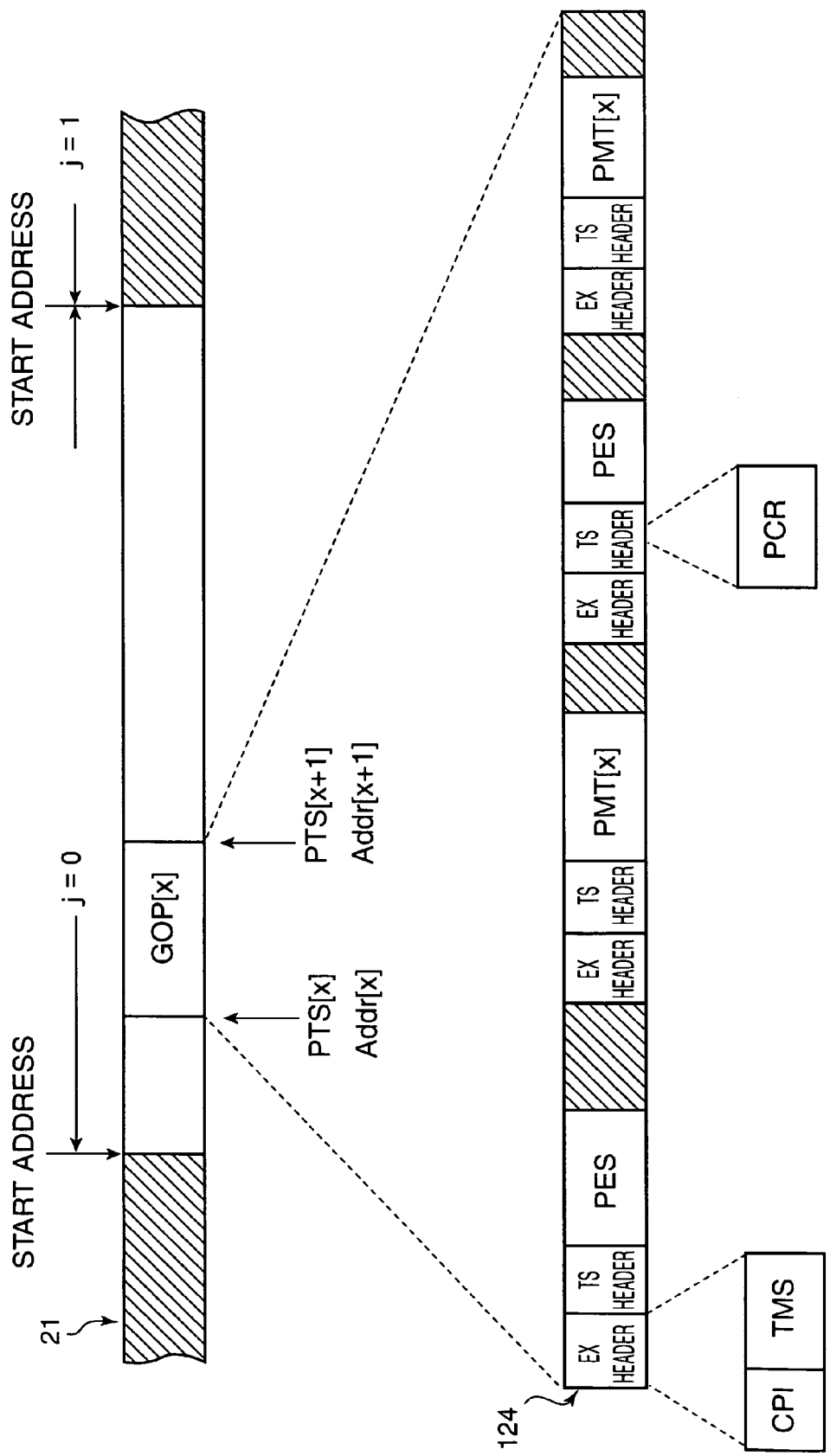
FIG. 9 is a representation, showing the data structure of a GOP of the stream of FIG. 5.

FIG. 9 is a representation, showing the data structure of the stream file 21 which is recorded together with the management-information file 20 in the record medium 122. FIG. 9 illustrates, especially, the structure of the GOP which belongs to the section of the variable j=0 and 1. The leading address of the section which corresponds to each of the variable j=0, 1 is the start address. In FIG. 9, among the M pieces of GOP which belong to the section which corresponds to the variable j=0, the structure of the xth GOP from the head is represented and shown. The variable x is identical to any variable m within the range of 0 to M−1. The xth GOP from the head is expressed as a GOP[x]. In FIG. 9, the GOP[x] is designed to be read out to the temporary-storage memory 124.

In addition, in the example of FIG. 9, an address Add[x] of the xth GOP is given with the leading address of the TS packet which is located at the head of the xth GOP. In the xth GOP, there is included one or several TS packets which carry a PMT. As a typical example, it takes 0.5 seconds to present one GOP. The TS packet which carries a PMT is included in the stream, for example, at an interval of 0.1 seconds. In this case, five TS packets which carry a PMT are included inside of one GOP.

FIG. 10 is a flowchart, showing a procedure for creating a copyright table. In order to realize this procedure, different from FIG. 1, the time specification section 163 is configured by a part of the management-information control section 116. Based on the control by the playback-mode control section 112, the reading control section 114 reads out a stream from the stream file 21 which is stored in the record medium 122. In order to do that, first, the management-information control section 116 refers to the management-information file 20 which is read out to the management-information memory 140. Thereby, it acquires a PMT-PID of the section to which a stream to be read out to the temporary-storage memory 124 belongs, and an ES-PID of an ES to be read out to the temporary-storage memory 124 (in a step S101). The ES type which is specified by the variable k, for example, whether any of multi-views V1 to V3 should be chosen, is determined by a user's instruction.

Next, based on the ES-PID which it has acquired, the management-information control section 116 finds the ES-PID which is stored in stream position information inside of the management-information file 20. Then, in the ES which corresponds to the ES-PID, it acquires the PTS and address which corresponds to a GOP to be read (in a step S102). More specifically, through the transfer control section 118, the management-information control section 116 finds the mth loop that describes the PTS which: does not exceed the presentation time of a TS packet to be decoded which is given by the notification from the decoder 128; and is closest to the presentation time. Then, it acquires the PTS in the loop which it has found and the address which corresponds to this.

Next, the reading control section 114 acquires the address which has been acquired by the management-information control section 116, for example, through the playback-mode control section 112. Then, in the stream which is stored in the stream file 21, the reading control section 114 reads out a GOP which is recorded in the address which it has acquired or the following addresses. Then, it stores it in the temporary-storage memory 124 (in a step S103). Sequentially, from the GOP which has been read out to the temporary-storage memory 124, the copyright-information acquisition section 151 searches for the PMT which is given the PID which was earlier acquired by the management-information control section 116. If there are plural of pieces of PMT, for example, the copyright-information acquisition section 151 searches for the leading PMT. Then, the copyright-information acquisition section 151 searches for the descriptor of the found PMT. Then, it acquires copyright information, for example, CCI which is described in the descriptor (in a step S104).

Next, the copyright-information management section 152 creates a copyright table in which the PTS which has been acquired by the management-information control section 116 and the CCI which has been acquired by the copyright-information acquisition section 151 are recorded so as to correspond to each other. Then, it holds the copyright table temporarily (in a step S105). FIG. 11 is a table, illustrating the configuration of the copyright table which is created by the copyright-information management section 152. In the copyright table illustrated in FIG. 11, the CCI is described so as to correspond to the time which is indicated by the PTS of each GOP. The information which is recorded in the copyright table is adequate, as long as it is the contents within the range which is required for the output control section 130. Therefore, in the copyright table, every time a new GOP is read, a fresh PTS and the CCI which corresponds to this are recorded. But the information which corresponds to the GOP which is not required any more by the output control section 130 may be deleted.

(Copyright-Table Creation Example 2)

Figure 12:
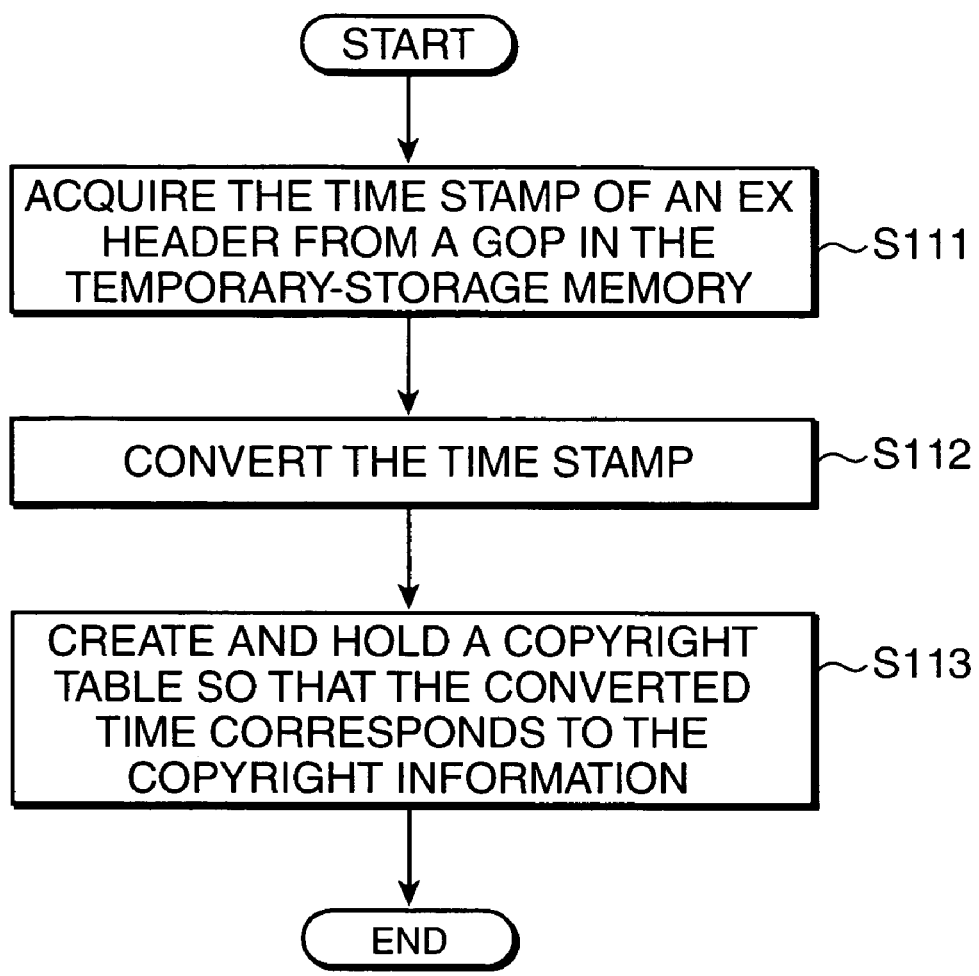
FIG. 12 is a flow chart, showing an example of another procedure for creating the copyright table.
Figure 16:
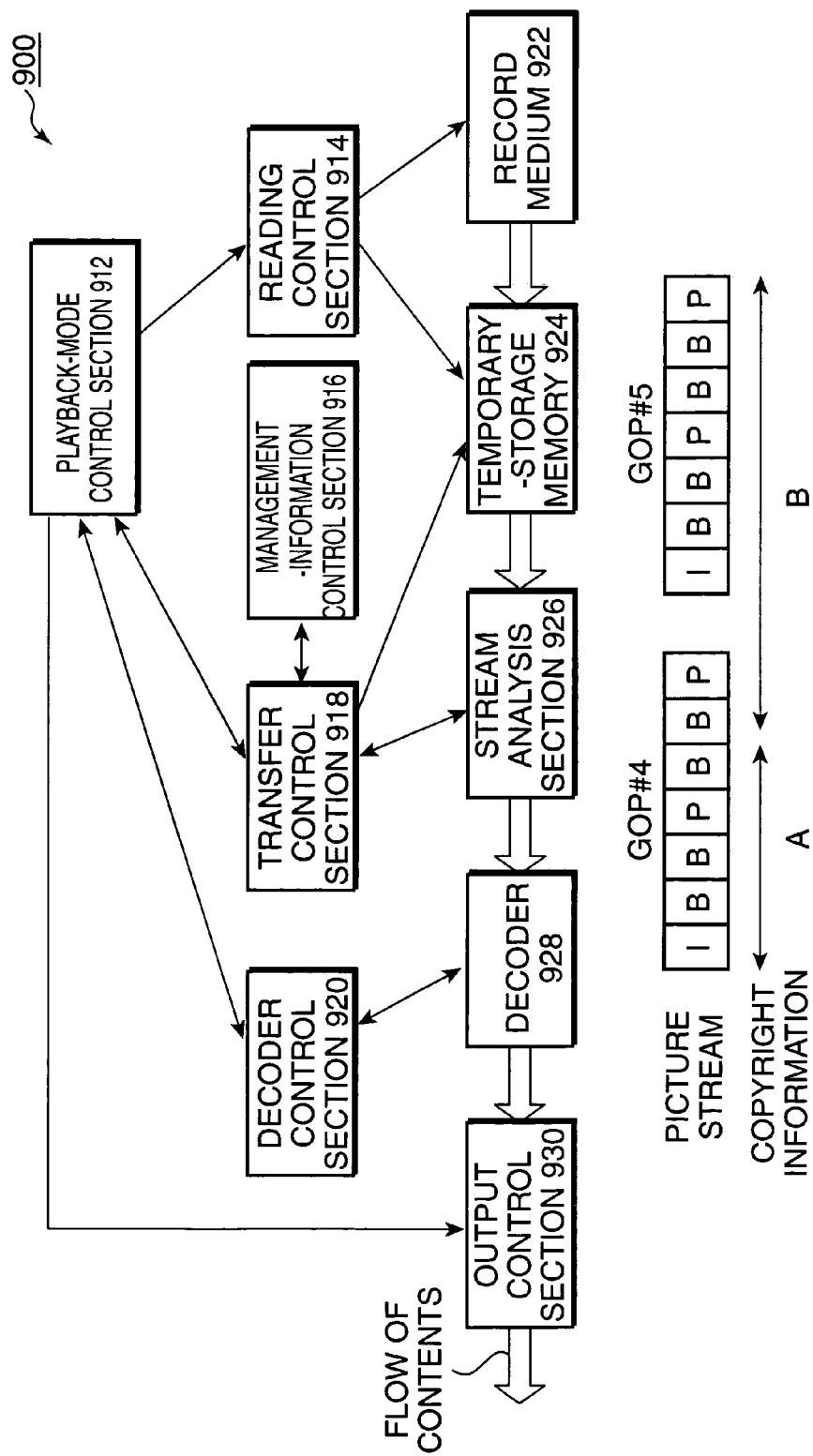
FIG. 16 is a block diagram, showing the configuration of a conventional playback apparatus.
Figure 17:
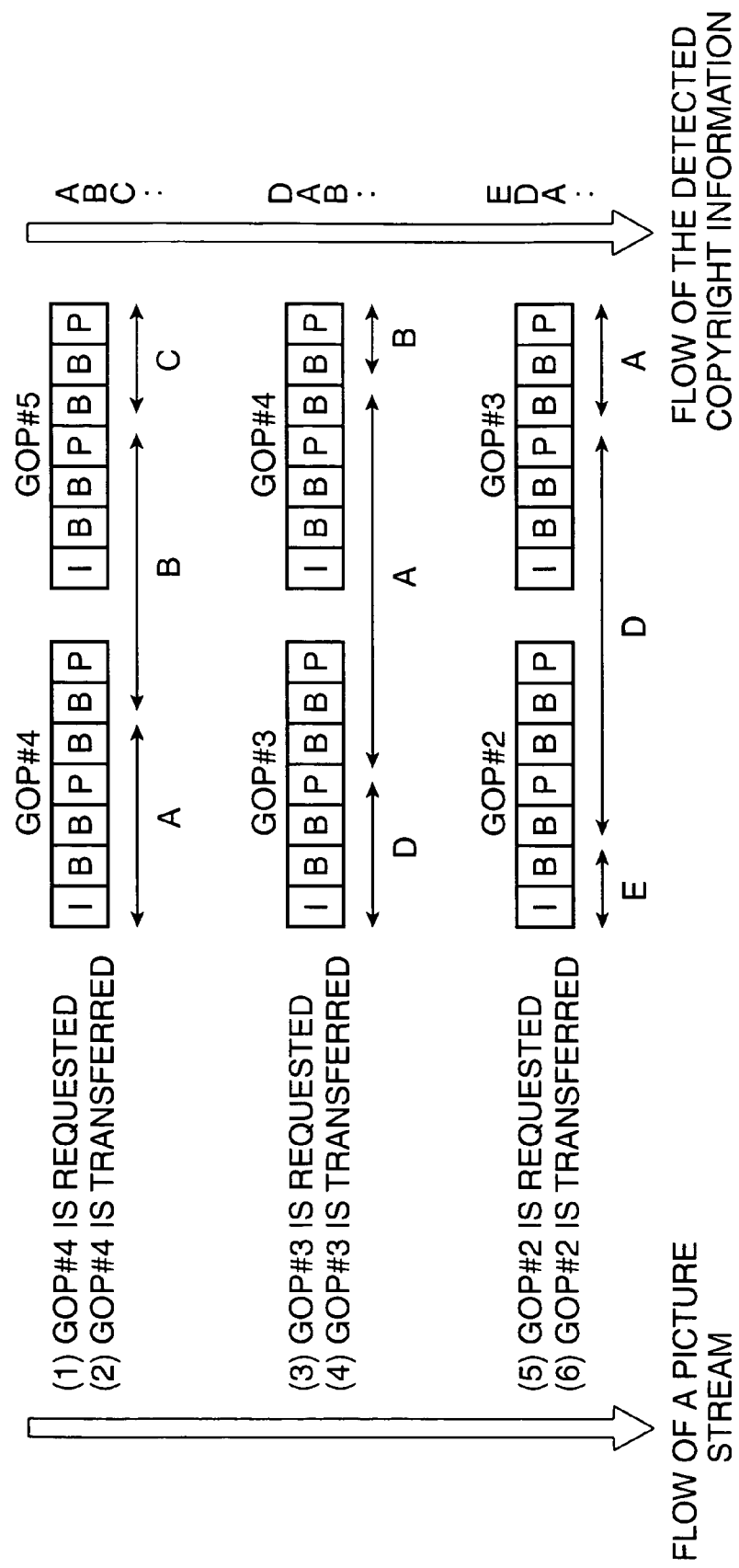
FIG. 17 is a representation, showing a simplified example of the flow of a video stream and copyright information.

In the above described example, in the copyright table, the time in the unit of a GOP and the copyright information are recorded so as to correspond to each other. In contrast, it is also possible to create a copyright table in which the relation between the time and the copyright information is recorded at an interval shorter than that of the GOP unit. FIG. 12 to FIG. 14 are each a flow chart, showing an example of such a processing procedure. With respect to the step S105 (see FIG. 9) of creating and holding a copyright table, another processing procedure is shown which is different from the procedure according to the Creation Example 1. In order to realize the procedures of FIG. 12 to FIG. 14, in such a way as described in FIG. 1, the time specification section 163 is configured by a part of the copyright-information acquisition section 151.

In the example of FIG. 12, when the processing of the step S105 starts, the copyright-information acquisition section 151 acquires a time stamp (or TMS) which is given to an EX header from a GOP which is stored in the temporary-storage memory 124 (in a step S111). As shown in FIG. 9, the TMS is appended to the EX header of each of the TS packets which makes up the GOP. Hence, a plurality of pieces of TMS are acquired from the single GOP.

Next, the copyright-information acquisition section 151 converts the TMS it has acquired into the time in the same unit as a PTS (in a step S112). Among the plurality of pieces of TMS which are included in the single GOP, the head is expressed as a TMS[0] and the nth is expressed as a TMS[n]. Then, a time t[n] which corresponds to the TMS[n] which is obtained by the conversion is given by a Formula 1 below.

$$t[n]=PTS[x]+\text{unit-conversion}(TMS[n]-TMS[0]) \quad \text{(Formula 1)}$$

Therefore, the time t[n] can be used as an approximate value of the presentation time.

Herein, the unit-conversion means an arithmetic operation for converting, if the PTS is typically calculated in a unit of 90 kHz and the TMS is calculated, for example, in a unit of 27 MHz, the time in a unit of 27 MHz into the time in a unit of 90 kHz. The TMS is expressed at 33 bits, and thus, if it is calculated in a unit of 27 MHz, it overflows in a few minutes. If the TMS overflows, it returns to its initial value. Thereafter, an increment is executed until it overflows again. In the calculation of the Formula 1, if the TMS[0] is a value before it overflows and the TMS[n] is a value after it overflows, a correction is made in the overflow. The procedure for correcting the overflow itself is conventionally known, and thus, its description is omitted.

Next, the copyright-information management section 152 creates a copyright table where the time t[n] which has been calculated by the copyright-information acquisition section 151 and the CCI which has been acquired by the copyright-information acquisition section 151 in the step 104 are recorded so as to correspond to each other. Then, it holds the copyright table temporarily (in a step S113). The processing of each of the steps S111 to S113 may also be executed in a lump for the several TMS[n]. Every time the loop of the steps S111 to S113 takes a round, the processing may also be executed for a single TMS[n].

FIG. 15 is a table, illustrating the configuration of the copyright table which is created by the copyright-information management section 152 in the step S113. In the copyright table illustrated in FIG. 15, the CCI is described so as to correspond to each time t[n].

In the step S111, the copyright-information acquisition section 151 may also acquire the TMS from all the TS packets which have an EX header. In addition, it may also choose and acquire the TMS from a part of the TS packets. For example, the copyright-information acquisition section 151 may also acquire the TMS only from the TS packet which carries a PMT.

In the example of FIG. 13, when the processing of the step S105 starts, the copyright-information acquisition section 151 acquires a PCR-PID that is described in the PMT which has been found in the step S104 (in a step S121). Next, the copyright-information acquisition section 151 searches for the TS packet which has the PCR-PID in a TS header from a GOP which is stored in the temporary-storage memory 124. Then, it acquires a PCR from the TS packet it has found (in a step S122). In FIG. 9, only one TS packet which has a PCR is shown in a single GOP. However, a plurality of TS packets can generally be included. For example, if a TS packet which has a PCR is included at a cycle of 0.1 seconds in a stream and the cycle of a GOP is typical 0.5 seconds, then five pieces of PCR can be acquired from a single GOP.

Next, the copyright-information acquisition section 151 converts the PCR it has acquired into the time in the same unit as a PTS (in a step S123). Among the plurality of pieces of PCR which are included in the single GOP, the head is expressed as a PCR[0] and the nth is expressed as a PCR[n]. Then, a time t[n] which corresponds to the PCR[n] which is obtained by the conversion is given by a Formula 2 below.

$$t[n]=PTS[x]+\text{unit-conversion}(PCR[n]-PCR[0]) \quad \text{(Formula 2)}$$

Therefore, the time t[n] can be used as an approximate value of the presentation time.

Herein, the unit-conversion means the same arithmetic operation as the unit-conversion of the Formula 1. The PCR is typically calculated in a unit of 27 MHz.

Next, the copyright-information management section 152 creates a copyright table where the time t[n] which has been calculated by the copyright-information acquisition section 151 and the CCI which has been acquired by the copyright-information acquisition section 151 in the step 104 are recorded so as to correspond to each other. Then, it holds the copyright table temporarily (in a step S124). The processing of each of the steps S121 to S124 may also be executed in a lump for the several PCR[n]. Every time the loop of the steps S121 to S124 takes a round, the processing P1558 may also be executed for a single PCR[n]. The configuration of the copyright table which is created by the copyright-information management section 152 in the step S124 can be illustrated in FIG. 15.

In the example of FIG. 14, when the processing of the step S105 starts, the copyright-information acquisition section 151 acquires the leading address of a GOP which is stored in the temporary-storage memory 124 (in a step S131). Herein, the leading address is the address of the temporary-storage memory 124. Next, the copyright-information acquisition section 151 acquires the address of the TS packet that carries a PMT which has been found in the step S104 (in a step S132). The address of a TS packet to be acquired is, for example, the leading address of the TS packet. As described already, a plurality of TS packets which carry a PMT are generally be included in a single GOP.

Next, the copyright-information acquisition section 151 converts the address it has acquired into the time in the same unit as a PTS (in a step S133). The leading address of a GOP is expressed as an ADD[0] and the nth address it has acquired is expressed as an ADD[n]. Then, a time t[n] which corresponds to the ADD[n] which is obtained by the conversion is given by a Formula 3 below.

$$t[n]=PTS[x]+\text{unit-conversion}(ADD[n]-ADD[0]) \quad \text{(Formula 3)}$$

Therefore, the time t[n] can be used as an approximate value of the presentation time.

Herein, unit-conversion means an arithmetic operation for converting the interval of an address into a time interval. For example, it means that if the GOP is set at 0.5 seconds, the value which is obtained by dividing the subtractive value of the unit-conversion by the size of the GOP is multiplied by 0.5 seconds, so that it can agree with the unit of the PTS.

Next, the copyright-information management section 152 creates a copyright table where the time t[n] which has been calculated by the copyright-information acquisition section 151 and the CCI which has been acquired by the copyright-information acquisition section 151 in the step 104 are recorded so as to correspond to each other. Then, it holds the copyright table temporarily (in a step S134). The processing of each of the steps S131 to S134 may also be executed in a lump for the several ADD[n]. Every time the loop of the steps S131 to S134 takes a round, the processing may also be executed for a single ADD[n]. The configuration of the copyright table which is created by the copyright-information management section 152 in the step S134 can be illustrated in FIG. 15.

In each of FIG. 10 to FIG. 15, an example is shown in which reading from the record medium 122 to the temporary-storage memory 124 is executed in the GOP unit which is defined in the MPEG. In contrast, in the general case where the structure of a stream is not limited to the MPEG standard, such reading may be executed in the minimum data unit where the presentation data can be made up again. The GOP which is defined in the MPEG standard is equivalent to an example of the minimum data unit. In addition, there is an open-type GOP which requires, in order to decode the GOP, picture data on another GOP. With respect to such a GOP, some of them are collected so that the minimum data unit can be made up.

OTHER EMBODIMENTS (1) In the above described embodiment, as an example of the operation in a special playback mode of the playback apparatus 100, the operation in a reverse playback mode is described. Then, the stream analysis section 126 separates the presentation data and the attribute information from the stream which has been read out to the temporary-storage memory 124. Thereby, it has the function of sending the presentation data to the decoder 128. On the other hand, the attribute information is extracted from the stream by the copyright-information acquisition section 151.

In contrast, in a normal playback mode, there is no need to create a copyright table. Thus, in the same way as the stream analysis section 926 of the conventional playback apparatus 900, the stream analysis section 126 the attribute information which has been separated from the stream may also be a subject to be analyzed. In that case, there is no need for the copyright-information acquisition section 151 to extract the attribute information. Or, even in the normal playback mode, instead of the stream analysis section 126, the copyright-information acquisition section 151 may also extract the attribute information. In that case, the stream analysis section 126 has only the function of separating the presentation data and the attribute information from the stream.

(2) In the above described embodiment, as the attribute information such as copyright information to be extracted from the stream, there are illustrated the information which is described in a PMT and the information which is described in an EX header which are based on the ISO/IEC13818-1 standard. In contrast, in addition to the PMT, the attribute information which is generally described in PSI (or program specific information) based on the ISO/IEC13818-1 standard may also be a subject to be extracted. Furthermore, as the attribute information to be extracted from the stream, there can be included parental information, genre information, text information and the like which is defined by the ARIB (or Association of Radio Industries and Businesses: Japanese corporation). The parental information is information which prompts a keyword input for restricting playback according to age or the like. The genre information is information which indicates the genre (e.g., news and a drama) of presentation data. The text information is information which indicates the title or the like of presentation data. Moreover, as the attribute information to be extracted from the stream, there can be adopted the attribute information such as copyright information which is defined by the ATSC (or Advanced Television Systems Committee: the ARIB's US counterpart) or the DVB (or Digital Video Broadcasting: the ARIB's European counterpart).

BRIEF SUMMARY OF EMBODIMENTS (1) A playback apparatus to which a record medium is connected, comprises: a memory; a reading section which reads, from the record medium to the memory, a stream that is a data row which includes encoded presentation data and attribute information on the presentation data, the presentation data and the attribute information being multiplexed in the data row; a separation section which separates the presentation data from the stream that has been read to the memory; a decoding section which decodes the separated presentation data; an output section which outputs the decoded presentation data; an extraction section which extracts the attribute information from the stream that has been read to the memory; a time specification section which specifies a presentation time for the presentation data that corresponds to the extracted attribute information; a table creation section which creates a table in which the presentation time and the attribute information are recorded so as to correspond to each other; and a reflection section which, referring to the table, reflects the attribute information in an output of the presentation data by the output section at a specific time that is indicated by the corresponding presentation time.

According to this configuration, the encoded presentation data is separated from the stream which has been read out to the memory from the record medium. Then, it is decoded and outputted. In order to reflect the attribute information in the output of the presentation data, the attribute information is extracted from the stream which has been read out to the memory from the record medium. Next, a presentation time is specified for the presentation data that corresponds to the extracted attribute information. Sequentially, a table is created in which they are recorded so as to correspond to each other. Then, at a specific time that is indicated by the presentation time which has been recorded in the table, the attribute information which corresponds to the presentation time is reflected in the output of the presentation data. Therefore, even if the playback mode of the playback apparatus is a special playback mode such as a fast playback and a reverse playback, other than a normal playback, then the attribute information is reflected at an appropriate time in an output of the decoded presentation data.

Such attribute information can include, for example, copyright information which defines restrictions on copying, parental information which prompts a keyword input for restricting playback according to age or the like, genre information which indicates the genre (e.g., news and a drama) of presentation data, text information which indicates the title or the like of presentation data, and the like. Besides, as a form of encoding and decoding, compression and expansion can be used.

(2) A playback apparatus is the apparatus (1), wherein the reflection section multiplexes the attribute information and the presentation data, without changing the attribute information or after changing the attribute information, and thereby reflects the attribute information in the output.

According to this configuration, as the form of reflecting the attribute information in the output after the decoding, the attribute information and the presentation data are multiplexed. Therefore, a stream can be outputted in which the attribute information is multiplexed at a position suitable for the decoded presentation data. Such multiplexing includes the form of multiplexing the extracted attribute information, as it is, with respect to the decoded presentation data. It also includes the form of changing and multiplexing the extracted attribute information. As such a changing form, for example, in the case where a stream is played which includes copyright information that defines the number of times up to which a copy can be made, the form can be adopted of reducing that number of times by one time.

(3) A playback apparatus is the apparatus (1) or (2), wherein the reflection section stops an output of the presentation data by the output section according to the contents of the attribute information, and thereby reflects the attribute information in the output.

According to this configuration, as the form of reflecting the attribute information in the output after the decoding, the output of the presentation data is stopped. Therefore, at a time suitable for the decoded presentation data, the output of the presentation data can be stopped based on the attribute information. As such a case in which the output of the presentation data should be stopped, if the presentation data includes copyright information that defines restrictions on copying, the case can be mentioned in which the copyright information defines that copying should be entirely prohibited after a certain presentation time.

(4) A playback apparatus is any one of the apparatuses (1) to (3), wherein the attribute information includes copyright information which defines restrictions on copying.

According to this configuration, the attribute information includes copyright information which defines restrictions on copying. Therefore, the copyright information can be reflected at an appropriate time in the output of the decoded presentation data. This makes it possible to properly protect the copyright on the presentation data.

(5) A playback apparatus is any one of the apparatuses (1) to (4), wherein: the decoding section sequentially notifies the reflection section of a presentation time for a part to be decoded in the presentation data; and the reflection section selects, from the table, the attribute information which corresponds to the presentation time that has been notified.

According to this configuration, the decoding section sequentially notifies the reflection section of a presentation time for a part to be decoded in the presentation data. Then, the attribute information which corresponds to the presentation time that has been notified is selected from the table by the reflection section. In short, the attribute information is chosen synchronously with the decoding processing by the decoding section. Therefore, a configuration can be simply and easily realized in which the attribute information can be reflected at an appropriate time in the output of the decoded presentation data.

(6) A playback apparatus is any one of the apparatuses (1) to (5), wherein: the playback apparatus, referring to the memory as a first memory, and further comprises a second memory; the reading section, before reading the stream, further reads, to the second memory, management information which is incidental to the stream and recorded in the record medium, and which, referring to the attribute information as first attribute information, includes second attribute information on the stream; the playback apparatus further comprises a synthesis section which generates third attribute information by extracting the second attribute information from the management information that has been read to the second memory, and combining the first attribute information and the second attribute information; and the reflection section reflects, in the output, the third attribute information which has been generated by the synthesis section, and thereby reflects the first attribute information in the output.

According to this configuration, before the stream is read, management information is read out to the second memory from the record medium. Then, the third attribute information, which is obtained by combining the first attribute information which has been extracted from the stream and the second attribute information which has been extracted from the management information, is reflected in the output of the decoded presentation data. This makes it possible to reflect, in the output, not only the first attribute information which is included in the stream, but also the second attribute information which is included in the management information. As the form of combining the first attribute information and the second attribute information, if each of them includes copyright information which defines restrictions on copying, a form can be illustrated in which the strictest restriction contents are included in the third attribute information. Herein, the second memory may also be separate from the first memory. Besides, they may also be a different storage area from each other in one and the same memory.

(7) A playback apparatus is the apparatus (6), wherein: the stream is configured by a group of minimum data units from each of which a corresponding part of the presentation data can be reconfigured; in the management information, an address is described of each minimum data unit, and a time stamp for each minimum data unit is described as the presentation time; the decoding section sequentially notifies the time specification section of a presentation time for a part to be decoded in the presentation data; the time specification section extracts, from the management information which has been read to the second memory, a time stamp which is closest to and not later than the presentation time that has been notified; the reading section extracts, from the management information, an address which corresponds to the time stamp that has been extracted by the time specification section, and reads, from the record medium to the first memory, a minimum data unit which corresponds to the address; and the extraction section extracts the attribute information from the minimum data unit which has been read to the first memory.

According to this configuration, the decoding section sequentially notifies the time specification section of a presentation time for a part to be decoded in the presentation data. Then, a time stamp which is closest to and not later than the presentation time that has been notified is extracted from the management information which has been read to the second memory. Next, an address which corresponds to the extracted time stamp is extracted from the management information. Then, a minimum data unit which corresponds to the address is read out to the first memory. Next, the attribute information is extracted from the read-out minimum data unit. Consequently, a table is created where the relation between the presentation time and the attribute information is recorded in each minimum data unit. Therefore, the attribute information can be reflected with a precision of the minimum data unit in the output of the decoded presentation data.

(8) A playback apparatus is any one of the apparatuses (1) to (5), wherein: the playback apparatus, referring to the memory as a first memory, further comprises a second memory; the reading section, before reading the stream, further reads, to the second memory, management information which is incidental to the stream and recorded in the record medium; the stream is configured by a group of minimum data units from each of which a corresponding part of the presentation data can be reconfigured; in the management information, an address is described of each minimum data unit, and a time stamp for each minimum data unit is described as the presentation time; the decoding section sequentially notifies the time specification section of a presentation time for a part to be decoded in the presentation data; the time specification section extracts, from the management information which has been read to the second memory, a time stamp which is closest to and not later than the presentation time that has been notified; the reading section extracts, from the management information, an address which corresponds to the time stamp that has been extracted by the time specification section, and reads, from the record medium to the first memory, a minimum data unit which corresponds to the address; and the extraction section extracts the attribute information from the minimum data unit which has been read to the first memory.

According to this configuration, for the same reason as the reason described in the playback apparatus according to the seventh aspect, the attribute information can be reflected with a precision of the minimum data unit in the output of the decoded presentation data. Herein, the second memory may also be separate from the first memory. Besides, they may also be a different storage area from each other in one and the same memory.

(9) A playback apparatus is any one of the apparatuses (1) to (8), wherein: the stream is a transport stream which is defined in an MPEG2-TS; the extraction section extracts, as the attribute information, both of first information which is described in a PMT that is placed in a section-data format in a payload of a TS packet and second information which is included in an extended header that is added to the TS packet; the playback apparatus further comprises a combination section which generates third information by combining the first information and the second information; and the reflection section reflects, in the output, the third information which has been generated by the combination section as the attribute information.

According to this configuration, the third information, which is obtained by combining the first information which is described in a PMT as the attribute information and the second information which is included in an extended header, is reflected in the output of the decoded presentation data. In short, various pieces of attribute information which are included in a stream can be reflected in the output. As the form of combining the first information and the second information, if each of them includes copyright information which defines restrictions on copying, a form can be illustrated in which the strictest restriction contents are included in the third information. After the third information is synthesized, the table creation section may also create a table in which the presentation time and the third information are recorded so that they correspond to each other. In addition, before it is synthesized, the table creation section may also create a table in which the first information and the second information are recorded so that they each correspond to the presentation time.

(10) A playback apparatus is any one of the apparatuses (1) to (5), wherein: the degeneration apparatus, referring to the memory as a first memory, further comprises a second memory; the reading section further reads, before reading the stream, to the second memory, management information which is incidental to the stream and recorded in the record medium; the stream is configured by a group of minimum data units from each of which a corresponding part of the presentation data can be reconfigured; in the management information, an address is described of each minimum data unit, and a time stamp is described for each minimum data unit; the decoding section sequentially notifies the reading section of a presentation time for a part to be decoded in the presentation data; the reading section extracts, from the management information which has been read to the second memory, an address that corresponds to a time stamp which is closest to and not later than the presentation time that has been notified, and reads, from the record medium to the first memory, a minimum data unit which corresponds to the address; the extraction section extracts the attribute information from the minimum data unit which has been read to the first memory; and the time specification section specifies the presentation time from the minimum data unit which has been read to the first memory.

According to this configuration, the decoding section sequentially notifies the reading section of a presentation time for a part to be decoded in the presentation data. Then, a time stamp which is closest to and not later than the presentation time that has been notified is extracted from the management information which has been read to the second memory. Next, an address which corresponds to the extracted time stamp is extracted from the management information. Then, a minimum data unit which corresponds to the address is read out to the first memory. Next, the attribute information is extracted from the read-out minimum data unit, and the presentation time is specified from the read out minimum data unit. Consequently, a table is easily created where the relation between the presentation time and the attribute information is recorded. Besides, a plurality of presentation times can be specified from a single minimum data unit. This makes it possible to obtain a table where the relation between the presentation time and the attribute information is recorded in a unit shorter than the minimum data unit.

(11) A playback apparatus is the apparatus (6), wherein: the stream is configured by a group of minimum data units from each of which a corresponding part of the presentation data can be reconfigured; in the management information, an address is described of each minimum data unit, and a time stamp is described for each minimum data unit; the decoding section sequentially notifies the reading section of a presentation time for a part to be decoded in the presentation data; the reading section extracts, from the management information which has been read to the second memory, an address that corresponds to a time stamp which is closest to and not later than the presentation time that has been notified, and reads, from the record medium to the first memory, a minimum data unit which corresponds to the address; the extraction section extracts the attribute information from the minimum data unit which has been read to the first memory; and the time specification section specifies the presentation time from the minimum data unit which has been read to the first memory.

According to this configuration, for the same reason as the reason described in the tenth aspect, a table is easily created where the relation between the presentation time and the attribute information is recorded. Besides, a table can be obtained where the relation between the presentation time and the attribute information is recorded in a unit shorter than the minimum data unit.

(12) A playback apparatus is the apparatus (10) or (11), wherein: the stream is a transport stream which is defined in an MPEG2-TS; and the minimum data unit is a GOP.

According to this configuration, with respect to a transport stream which is defined in an MPEG2-TS, which is a common digital-broadcasting standard in Japan, Europe and the United States, a table is easily created where the relation between the presentation time and the attribute information is recorded. Besides, a table can be obtained where the relation between the presentation time and the attribute information is recorded in a unit shorter than the GOP. Herein, in this embodiment, the transport stream which is defined in an MPEG2-TS may include an extended header, or it may not include an extended header.

(13) A playback apparatus is the apparatus (12), wherein the time specification section: extracts a time stamp in which an output time is described, the time stamp being included in an extended header that is added to a TS packet of a GOP which has been read to the first memory; and specifies, as the presentation time, a value which is obtained by converting the time stamp into a PTS that is given to a certain TS packet.

According to this configuration, a time stamp is extracted which is included in an extended header that is added to a TS packet. Therefore, the presentation time to be recorded in a table can be easily specified in a unit shorter than the GOP.

(14) A playback apparatus is the apparatus (12), wherein the time specification section: extracts PCR which is given to a TS header of a TS packet of a GOP which has been read to the first memory; and specifies, as the presentation time, a value which is obtained by converting the PCR into a certain PTS that is given to a TS packet.

According to this configuration, PCR which is given to a TS packet is extracted and converted. Therefore, the presentation time to be recorded in a table can be specified in a unit where PCR appears in a stream.

(15) A playback apparatus is the apparatus (12), wherein the time specification section: extracts an address of a TS packet of a GOP which has been read to the first memory; and specifies, as the presentation time, a value which is obtained by converting the address into a PTS that is given to a certain TS packet.

According to this configuration, an address of a TS packet is extracted and converted. Therefore, the presentation time to be recorded in a table can be specified in a unit of the TS packet in a stream.

(16) A playback method, comprises: a step of preparing a memory; a reading step of reading, from the record medium to the memory, a stream that is a data row which includes encoded presentation data and attribute information on the presentation data, the presentation data and the attribute information being multiplexed in the data row; a separating step of separating the presentation data from the stream that has been read to the memory; a decoding step of decoding the separated presentation data; an outputting step of outputting the decoded presentation data; an extracting step of extracting the attribute information from the stream that has been read to the memory; a time specifying step of specifying a presentation time for the presentation data that corresponds to the extracted attribute information; a table creating step of creating a table in which the presentation time and the attribute information are recorded so as to correspond to each other; and a reflecting step of, referring to the table, reflecting the attribute information in an output of the presentation data by the output section at a specific time that is indicated by the corresponding presentation time.

According to this configuration, the encoded presentation data is separated from the stream which has been read out to the memory from the record medium. Then, it is decoded and outputted. In order to reflect the attribute information in the output of the presentation data, the attribute information is extracted from the stream which has been read out to the memory from the record medium. Next, a presentation time is specified for the presentation data that corresponds to the extracted attribute information. Sequentially, a table is created in which they are recorded so as to correspond to each other. Then, at a specific time that is indicated by the presentation time which has been recorded in the table, the attribute information which corresponds to the presentation time is reflected in the output of the presentation data. Therefore, for the same reason as the reason described in the playback apparatus according to the first aspect, even if the playback mode of the playback method is a special playback mode such as a fast playback and a reverse playback, other than a normal playback, then the attribute information is reflected at an appropriate time in an output of the decoded presentation data.

(17) A program product, comprises: a playback processing program which allows a computer, the computer being incorporated in a playback apparatus which includes a memory and to which a record medium is connected, to function as: a reading section which reads, from the record medium to the memory, a stream that is a data row which includes encoded presentation data and attribute information on the presentation data, the presentation data and the attribute information being multiplexed in the data row; a separation section which separates the presentation data from the stream that has been read to the memory; a decoding section which decodes the separated presentation data; an output section which outputs the decoded presentation data; an extraction section which extracts the attribute information from the stream that has been read to the memory; a time specification section which specifies a presentation time for the presentation data that corresponds to the extracted attribute information; a table creation section which creates a table in which the presentation time and the attribute information are recorded so as to correspond to each other; and a reflection section which, referring to the table, reflects the attribute information in an output of the presentation data by the output section at a specific time that is indicated by the corresponding presentation time, and a signal holding medium for holding the a playback processing program.

According to this configuration, the playback processing program is executed by a computer, so that the operation of the playback apparatus according to the first aspect can be realized. Therefore, for the same reason as the reason described in the playback apparatus according to the first aspect, even if the playback mode of the playback apparatus is a special playback mode such as a fast playback and a reverse playback, other than a normal playback, then the attribute information is reflected at an appropriate time in an output of the decoded presentation data.

(18) A program product is the program product (17), wherein the signal holding medium is at least one of a storage medium and a transmission medium.

According to this configuration, the playback processing program is read by a computer from at least one of the storage medium and the transmission medium, and thereby, the playback processing program is executed. As a result, the operation of the playback apparatus according to the first aspect can be realized.

The playback apparatus, the playback method, and the program product wherein the playback processing program is held by a signal holding medium according to the present invention are capable of precisely reflecting attribute information such as copyright information inside of a stream in the output of the stream, even in a special playback mode, such as a reverse slow playback, a fast playback and a reverse playback. Therefore, they are industrially useful.

This application is based on Japanese patent application serial No. 2004-108847, filed in Japan Patent Office on Apr. 1, 2004, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A playback apparatus for outputting presentation data recorded on a record medium, comprising:
   a memory;
   a reading section which reads, from the record medium to the memory, a stream that is a data row which includes encoded presentation data and attribute information related to the presentation data, the presentation data and the attribute information being multiplexed in the data row;
   a separation section which separates the presentation data from the stream that has been read to the memory;
   a decoding section which decodes the separated presentation data;
   an output section which outputs the decoded presentation data;
   an extraction section which extracts the attribute information from the stream that has been read to the memory;
   a time specification section which specifies a presentation time for the presentation data that corresponds to the extracted attribute information;
   a table creation section which creates a table in which the presentation time specified by the time specification section and the attribute information extracted by the extraction section are recorded so as to correspond to each other; and
   a reflection section which, referring to the table, selects specific attribute information from the table according to a presentation time for the presentation data being outputted by the output section, and reflects the specific attribute information in an output of the presentation data by the output section.

2. The playback apparatus according to claim 1, wherein the reflection section multiplexes the specific attribute information and the presentation data, without changing the specific attribute information or after changing the specific attribute information, and thereby reflects the specific attribute information in the output.

3. The playback apparatus according to claim 1, wherein the reflection section stops an output of the presentation data by the output section according to the contents of the specific attribute information, and thereby reflects the specific attribute information in the output.

4. The playback apparatus according to claim 1, wherein the specific attribute information includes copyright information which defines restrictions on copying, and the reflection section reflects the copyright information in the output.

5. The playback apparatus according to claim 1, wherein:
the decoding section sequentially indicates to the reflection section a presentation time for a part to be decoded in the presentation data; and
the reflection section selects, from the table, the specific attribute information which corresponds to the presentation time that has been indicated by the decoding section.

6. The playback apparatus according to claim 1, wherein:
the memory is a first memory, and the attribute information is first attribute information;
the playback apparatus further comprises a second memory;
the reading section, before reading the stream, further reads, to the second memory, management information which is incidental to the stream, is recorded in the record medium, and includes second attribute information related to the stream;
the playback apparatus further comprises a synthesis section which generates third attribute information by extracting the second attribute information from the management information that has been read to the second memory, and combining the first attribute information and the second attribute information; and
the reflection section reflects, in the output, the third attribute information which has been generated by the synthesis section, and thereby reflects the first attribute information in the output.

7. The playback apparatus according to claim 6, wherein:
the stream is configured by a group of minimum data units from each of which a corresponding part of the presentation data can be reconfigured;
in the management information, an address is identified for each minimum data unit, and a time stamp for each minimum data unit is identified as the presentation time;
the decoding section sequentially indicates to the time specification section a presentation time for a part to be decoded in the presentation data;
the time specification section extracts, from the management information which has been read to the second memory, a time stamp which is closest to and not later than the presentation time that has been indicated by the decoding section;
the reading section extracts, from the management information, an address which corresponds to the time stamp that has been extracted by the time specification section, and reads, from the record medium to the first memory, a minimum data unit which corresponds to the address; and
the extraction section extracts the attribute information from the minimum data unit which has been read to the first memory.

8. The playback apparatus according to claim 1, wherein:
the memory is a first memory;
the playback apparatus further comprises a second memory;
the reading section, before reading the stream, further reads, to the second memory, management information which is incidental to the stream and recorded in the record medium;

the stream is configured by a group of minimum data units from each of which a corresponding part of the presentation data can be reconfigured;
in the management information, an address is identified for each minimum data unit, and a time stamp for each minimum data unit is identified as the presentation time;
the decoding section sequentially indicates to the time specification section a presentation time for a part to be decoded in the presentation data;
the time specification section extracts, from the management information which has been read to the second memory, a time stamp which is closest to and not later than the presentation time that has been indicated by the decoding section;
the reading section extracts, from the management information, an address which corresponds to the time stamp that has been extracted by the time specification section, and reads, from the record medium to the first memory, a minimum data unit which corresponds to the address; and
the extraction section extracts the attribute information from the minimum data unit which has been read to the first memory.

9. The playback apparatus according to claim 1, wherein:
the stream is an MPEG2-TS transport stream;
the extraction section extracts, as the attribute information, both of first information which is described in a program map table that is placed in a section-data format in a payload of a TS packet and second information which is included in an extended header that is added to the TS packet;
the playback apparatus further comprises a combination section which generates third information by combining the first information and the second information; and
the reflection section reflects, in the output, the third information which has been generated by the combination section as the attribute information.

10. The playback apparatus according to claim 1, wherein:
the memory a is a first memory;
the playback apparatus further comprises a second memory;
the reading section further reads, before reading the stream, to the second memory, management information which is incidental to the stream and recorded in the record medium;
the stream is configured by a group of minimum data units from each of which a corresponding part of the presentation data can be reconfigured;
in the management information, an address is identified for each minimum data unit, and a time stamp is identified for each minimum data unit;
the decoding section sequentially notifies indicates to the reading section a presentation time for a part to be decoded in the presentation data;
the reading section extracts, from the management information which has been read to the second memory, an address that corresponds to a time stamp which is closest to and not later than the presentation time that has been indicated by the decoding section, and reads, from the record medium to the first memory, a minimum data unit which corresponds to the address;
the extraction section extracts the specific attribute information from the minimum data unit which has been read to the first memory; and the time specification section specifies the presentation time from the minimum data unit which has been read to the first memory.

11. The playback apparatus according to claim 6, wherein:
the stream is configured by a group of minimum data units from each of which a corresponding part of the presentation data can be reconfigured;
in the management information, an address is identified for each minimum data unit, and a time stamp is identified for each minimum data unit;
the decoding section sequentially indicates to the reading section a presentation time for a part to be decoded in the presentation data;
the reading section extracts, from the management information which has been read to the second memory, an address that corresponds to a time stamp which is closest to and not later than the presentation time that has been indicated by the decoding section, and reads, from the record medium to the first memory, a minimum data unit which corresponds to the address;
the extraction section extracts the specific attribute information from the minimum data unit which has been read to the first memory; and
the time specification section specifies the presentation time from the minimum data unit which has been read to the first memory.

12. The playback apparatus according to claim 10, wherein:
the stream is an MPEG2-TS transport stream; and
the minimum data unit is a GOP.

13. The playback apparatus according to claim 12, wherein the time specification section: extracts a time stamp in which an output time is described, the time stamp being included in an extended header that is added to a TS packet of a GOP which has been read to the first memory; and specifies, as the presentation time, a value which is obtained by converting the time stamp into a PTS that is given to a certain TS packet.

14. The playback apparatus according to claim 12, wherein the time specification section: extracts PCR which is given to a TS header of a TS packet of a GOP which has been read to the first memory; and specifies, as the presentation time, a value which is obtained by converting the PCR into a certain PTS that is given to a TS packet.

15. The playback apparatus according to claim 12, wherein the time specification section: extracts an address of a TS packet of a GOP which has been read to the first memory; and specifies, as the presentation time, a value which is obtained by converting the address into a PTS that is given to a certain TS packet.

16. The playback apparatus according to claim 11, wherein:
the stream is an MPEG2-TS transport stream; and
the minimum data unit is a GOP.

17. The playback apparatus according to claim 16, wherein the time specification section: extracts a time stamp in which an output time is described, the time stamp being included in an extended header that is added to a TS packet of a GOP which has been read to the first memory; and specifies, as the presentation time, a value which is obtained by converting the time stamp into a PTS that is given to a certain TS packet.

18. A playback method for outputting presentation data recorded on a record medium, comprising:
preparing a memory;
reading, from the record medium to the memory, a stream that is a data row which includes encoded presentation data and attribute information related to the presentation data, the presentation data and the attribute information being multiplexed in the data row;
separating the presentation data from the stream that has been read to the memory;
decoding the separated presentation data;
outputting the decoded presentation data;
extracting the attribute information from the stream that has been read to the memory;
specifying a presentation time for the presentation data that corresponds to the extracted attribute information;
creating a table in which the presentation time specified in said specifying and the attribute information extracted in said extracting are recorded so as to correspond to each other; and
selecting specific attribute information from the table according to a presentation time for the presentation data being outputted by said outputting, and reflecting the specific attribute information in an output of the presentation data by said outputting.

19. A computer-readable medium with instructions for causing a computer in a playback apparatus including a memory to output presentation data recorded on a record medium and for causing the computer to:
read, from the record medium to the memory, a stream that is a data row which includes encoded presentation data and attribute information related to the presentation data, the presentation data and the attribute information being multiplexed in the data row;
separate the presentation data from the stream that has been read to the memory;
decode the separated presentation data;
outputs output the decoded presentation data;
extract the attribute information from the stream that has been read to the memory;
specify a presentation time for the presentation data that corresponds to the extracted attribute information;
create a table in which the specified presentation time and the extracted attribute information are recorded so as to correspond to each other; and
select specific attribute information from the table according to a presentation time for the presentation data being outputted, and reflect the specific attribute information in an output of the presentation data.

* * * * *

UNITED STATES PATENT AND TRADEMARK OFFICE
CERTIFICATE OF CORRECTION

| | | |
|---|---|---|
| PATENT NO. | : 7,242,851 B2 | Page 1 of 1 |
| APPLICATION NO. | : 11/092759 | |
| DATED | : July 10, 2007 | |
| INVENTOR(S) | : Takeshi Nagao | |

It is certified that error appears in the above-identified patent and that said Letters Patent is hereby corrected as shown below:

In column 34, claim 19, line 43, "outputs output" should be --output--.

Signed and Sealed this

Twenty-fifth Day of March, 2008

JON W. DUDAS
*Director of the United States Patent and Trademark Office*